(12) United States Patent
Miyake et al.

(10) Patent No.: US 6,667,372 B1
(45) Date of Patent: Dec. 23, 2003

(54) CONTINUOUS MANUFACTURING METHOD OF WATER-ABSORBENT POLYMER

(75) Inventors: Koji Miyake, Akaiwa-gun (JP); Takumi Hatsuda, Takasago (JP); Sachio Fujita, Himeji (JP); Takashi Nishigaki, Himeji (JP); Kunihiko Ishizaki, Suita (JP); Katsuhiro Kajikawa, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 417 days.

(21) Appl. No.: 09/699,491

(22) Filed: Oct. 31, 2000

(30) Foreign Application Priority Data

Nov. 2, 1999 (JP) ............................................ 11-312893

(51) Int. Cl.$^7$ ................................................. C08F 2/10
(52) U.S. Cl. ............................ 526/61; 526/71; 526/930
(58) Field of Search .................... 526/317.1, 318.43, 526/318.5, 61, 71, 905, 930

(56) References Cited

U.S. PATENT DOCUMENTS

| | | | |
|---|---|---|---|
| 4,656,232 | A | 4/1987 | Nakaki et al. |
| 4,820,742 | A | 4/1989 | Alexander et al. |
| 4,857,610 | A | 8/1989 | Chmelir et al. |
| 4,893,999 | A | 1/1990 | Chmelir et al. |
| 4,985,518 | A | 1/1991 | Alexander et al. |
| 5,145,906 | A | 9/1992 | Chambers et al. |
| 5,275,773 | A | 1/1994 | Irie et al. |
| 5,380,808 | A | 1/1995 | Sumiya et al. |
| 6,071,976 | A | 6/2000 | Dairoku et al. |
| 6,100,305 | A | 8/2000 | Miyake et al. |

FOREIGN PATENT DOCUMENTS

| | | |
|---|---|---|
| EP | 0 496 067 A2 | 7/1992 |
| EP | 0 811 636 A1 | 12/1997 |
| EP | 0 827 753 A2 * | 3/1998 |
| EP | 0 885 917 A2 | 12/1998 |
| EP | 0 922 717 A1 * | 6/1999 |
| EP | 0 925 836 A1 | 6/1999 |
| EP | 0 948 997 A2 | 10/1999 |
| EP | 0 955 086 A2 | 11/1999 |

OTHER PUBLICATIONS

Japanese Publication for Unexamined patent Application No. 92307/1996 (Tokukaihei 8092307).
Japanese Publication for Unexamined Patent Application No. 302310/1999 (Tokukaihei 11–302310).

* cited by examiner

Primary Examiner—Robert Harlan
(74) Attorney, Agent, or Firm—Nixon & Vanderhye, P.C.; Frank P. Presta

(57) ABSTRACT

A continuous manufacturing method of a water-absorbent polymer by continuously performing a polymerization of a hydrophilic monomer using a solution containing a hydrophilic monomer, includes at least one of the following steps (A) to (D):

(A) introducing an inert gas into the solution in a continuous manner before subjecting the solution to a polymerization reaction, and subsequently removing the inert gas from the solution;

(B) supplying the solution to a polymerization process, and washing out the solution with water supplied before, at, or after a timing of supplying the solution to the polymerization process;

(C) detecting reaction temperatures of a polymerization reaction in non-contact manner at a plurality of points different distances away from a point where a solution is supplied; and (D) supplying water to a water-containing gel and/or transport means when transporting the water-containing gel of the water-absorbent polymer obtained in or after the polymerization reaction.

29 Claims, 8 Drawing Sheets

CONTINUOUS MANUFACTURING METHOD OF WATER-ABSORBENT POLYMER

FIELD OF THE INVENTION

The present invention relates to a manufacturing method of a water-absorbent polymer (water-absorbent resin, high water-absorbent polymer, high water-absorbent resin, water-swelling/water-insoluble resin, water-absorbent agent, water-absorbent particles) by performing a polymerization of a hydrophilic monomer in a continuous manner, and more particularly relates to a continuous manufacturing method of a water-absorbent polymer which includes at least one of the steps of 1) subjecting a solution containing a hydrophilic monomer such as water-soluble ethylenically unsaturated monomer to a polymerization reaction after removing therefrom oxygen dissolved therein; 2) placing the solution containing a hydrophilic monomer to an inert gas deaerator, a mixer for mixing the solution with a polymerization initiator, a polymerization section, or the like; 3) detecting reaction temperatures of the polymerization reaction using a plurality of temperature detection means provided in the polymerization section (polymerization zone); and 4) transporting a water-containing gel (hydrogel) resulting from the polymerization of the hydrophilic monomer.

BACKGROUND OF THE INVENTION

Water-absorbent polymers have been used in various applications: for example, absorbing materials for sanitary materials such as sanitary napkins, paper diapers (disposable diapers), etc.; drip absorbing materials; water retentive material for soil, or the like. These water-absorbent polymers are manufactured by performing a polymerization of a raw material of hydrophilic monomer (hereinafter may simply referred to as a monomer) in a batch manner or a continuous manner. The monomer is usually used in the polymerization reaction in a form of solution (hereinafter, referred to as a monomer solution). In this case; however, before carrying out the polymerization reaction, is performed the process of introducing an inert gas such as nitrogen gas, etc., into the monomer solution so as to remove therefrom oxygen dissolved therein.

The purpose of performing the above process is to suppress the adverse effects of oxygen (mainly oxygen dissolved in the solution) contained in the monomer solution on the polymerization reaction. By carrying out the polymerization reaction after removing oxygen contained in the monomer solution in the foregoing manner, the adverse effects of dissolved oxygen on the polymerization reaction can be suppressed, thereby permitting water-absorbent polymers having desirable properties to be manufactured at high yield.

In the case of polymerizing a monomer in a continuous manner, generally, an initiator of a polymerization reaction (hereinafter referred to as a polymerization initiator) is mixed with a monomer solution beforehand, and thus this continuous polymerization is performed by 1) mixing the monomer solution with a polymerization initiator in a mixing column (mixing vessel), and subsequently 2) supplying the monomer solution having the polymerization initiator mixed therewith on an upper surface of a transport belt polymerization device provided in a polymerization section via an inlet tube which constitutes a lower end part of the mixing column. In this way, the monomer in a form of a monomer solution can be supplied continuously, and a static polymerization (polymerization without stirring) can be performed on the belt in a continuous manner, thereby manufacturing water-absorbent polymers at high yield.

On the other hand, in the case of polymerizing a monomer in a batch manner, a polymerization initiator is mixed in a polymerization reaction container, and thus this batch-wise polymerization is performed by a) supplying a monomer solution in the polymerization reaction container such as a stainless tray or a kneader provided in the polymerization section, and subsequently mixing the monomer solution with a polymerization initiator in the polymerization reaction container. Alternately, the polymerization initiator can be mixed beforehand, and in this case, b) after the monomer solution is mixed with the polymerization initiator in the mixing column, the resulting mixture is supplied into the polymerization reaction container via the inlet tube which constitutes the lower end part of the mixing column, thereby polymerizing the monomer in a batch manner.

However, when manufacturing a water-absorbent polymer by performing a polymerization of a monomer, a temperature of the monomer (reaction temperature of the polymerization reaction) greatly vales due to heat generated in the polymerization reaction as will be explained in details below in reference to FIG. 8. Here, a monomer in the polymerization reaction indicates a mixture gel (reaction system) of the monomer and a water-absorbent polymer produced from the monomer.

As indicated by (A) in FIG. 8, at the beginning of the first half, reaction temperature increases gradually as the polymerization reaction proceeds smoothly, and then the reaction temperature starts increasing sharply towards a peak of the polymerization reaction (hereinafter referred to as a polymerization peak). For the second half of the polymerization reaction, i.e., the reaction after the polymerization peak, the reaction temperature drops sharply at the beginning, and starts decreasing gradually as time passes.

It is known that the described changes in reaction temperature in the polymerization reaction affect the properties of the resulting water-absorbent polymers or the yields thereof. For example, an excessive increase in reaction temperature (peak temperature) in the polymerization reaction causes the problems of: 1) an increase in ratio of unwanted secondary reaction; 2) an increase in soluble component in the water-absorbent polymer; 3) a reduction in absorbency with and without an applied pressure, and 4) a reduction in durability (gel stability against urine). On the other hand, an excessive reduction in reaction temperature in the second half of the polymerization reaction results in incomplete polymerization reaction, and this causes the problems of, for example, 1) an increase in an amount of monomer remaining in the water-absorbent polymer, 2) the resulting water-absorbent polymer is difficult to be handled due to an increase in viscosity, etc.

As a solution to the above problem, a device for use in producing water-absorbent polymers has been proposed by European Patent No. 922717A wherein the monomer is subjected to cooling for a predetermined time (reaction time from 0 to t in FIG. 8), and thereafter the monomer is subjected to heating for a predetermined time (reaction time after t in FIG. 8) when necessary. In the manufacturing device, a monomer to be polymerized is transported within the polymerization device by a transport belt, and first, a polymerization reaction of a monomer is performed while suppressing an excessive increase in the temperature of the monomer (reaction temperature) (i.e., under cooling for a predetermined time). Subsequently, a polymerization reaction is performed while suppressing an excessive decrease in temperature of the monomer (i.e., under heating for a predetermined time). As a result, variations in reaction temperature of the polymerization reaction as indicated by (B) in FIG. 8 can be achieved, and water-absorbent polymers having desirable properties can be produced at high yield.

The above water-absorbent polymers are initially produced in a form of a water-containing gel (water-containing gel-like crosslinked polymer). Then, the resulting water-containing gel is transported from the polymerization device to a gel granulator, for example, as disclosed in European Patent No. 925836A, to be granulated into granules of a predetermined size. The resulting granulated water-containing gel having a diameter of several tens cm square is then transported to, for example, a gel pulverizer such as meat chopper as disclosed in U.S. Pat. No. 5,275,773 to be pulverized into gel particles (one type of water-absorbent polymer) of a predetermined size (for example, a particle diameter of not more than 5 mm square). As necessary, the pulverized gel after being dried may be further subjected to grinding by a mill grinder to be water-absorbent particles or water-absorbent polymer particles (one type of water-absorbent polymer) of a size having a particle diameter in a range of from 10 $\mu$m to 2000 $\mu$m.

Transportation of the water-containing gel in and out from the polymerization device to the gel granulator, is performed by while being supported by a support face of the transport means (conveyer) such as an endless belt disposed between the polymerization device and the granulated gel (including inside the polymerization device or gel granulator).

(1) Polymerization of Monomer in the Exterior of Polymerization Device

Irrespectively of batch manner or continuous manner, when subjecting the monomer solution to the polymerization reaction, in some particular areas, such as mixing column, inlet tube, etc., retention or scattering of the monomer solution is likely to occur for their structures. For example, the mixing column or the inlet tube is generally structured so as to have a decreasing internal area from the top to the bottom (in this example, an area surrounded by a cross line between the inner surface of the mixing column or inlet tube and the horizontal plane), and for this structure, the retention of the monomer solution is liable to occur in the mixing column or inlet tube. Also, the monomer solution as being dispersed is liable to adhere to the outer surface of the inlet tube. Furthermore, such retention and dispersion of the monomer solution may cause a formation of a polymer from the monomer. This problem is likely to occur particularly in the case of adopting a monomer solution of high concentration (for example, not less than 10 percent by weight) and high viscosity.

Moreover, as described in Japanese Unexamined Patent Publication No. 126103/1986 (Tokukaisho 61-126103) (Publication Date: Jun. 13, 1986) (U.S. Pat. No. 4,656,232), a monomer solution containing an ethylenically unsaturated monomer is disturbed from being polymerized by oxygen dissolved in the monomer solution. Namely, oxygen is an excellent polymerization inhibitor for acrylic acid, and for this reason, generally, before starting the polymerization of the monomer solution, inert gas such as nitrogen gas is introduced into the solution for the purpose of removing therefrom dissolved oxygen. However, the monomer solution which has undergone removal of dissolved oxygen is very liable to be polymerized even in an absence of a polymerization initiator. Therefore, under conditions of an applied external factor such as stirring, light, etc., contaminated impurities, or highly concentrated monomer solution (for example, not less than several tens percent), etc., an undesirable polymerization reaction which causes the formation of the polymer in the exterior of the polymerization device is liable to take place.

The conventional method of supplying a monomer solution in a batch manner or a continuous manner, therefore has the following problems when polymerizing in the exterior of the polymerization device: 1) the polymer of the monomer adheres to and matures in a vicinity of a supply port (inner surface and outer surface) of the inlet tube for supplying the monomer solution to the polymerization section, or 2) the polymer adherers to and matures in the mixing column for mixing the monomer solution with the polymerization initiator.

Further, such polymer as adhered to and matured would disturb a smooth flow of the monomer solution, or 2) degrade properties of the resulting water-absorbent polymer as being contaminated in the monomer solution as foreign objects, and further raises the problem of wasting monomers as a raw material of water-absorbent polymers. These problems would be serious particularly in the case of continuously performing a polymerization of a monomer solution with which the polymerization initiator is mixed beforehand at industrial level.

(2) Deaeration From Monomer Solution

In the case of adopting the method of introducing inert gas in the monomer solution to remove therefrom oxygen dissolved therein, the resulting water-containing gel from a static polymerization has uncountable number of bubbles of inert gas having a particle diameter of several $\mu$m to several hundreds of $\mu$m dispersed therein. Such water-containing gel is formed probably because a polymerization reaction takes place with respect to the monomer solution containing a large amount of inert gas, and bubbles of the inert gas are dispersed in the resulting water-containing gel. This water-containing gel having dispersed therein bubbles of inert gas, etc., has the following problems.

In the case of grinding the water-containing gel after being dried in order to obtain water-absorbent particles (one type of water-absorbent polymer) having an average particle diameter in a range of from 200 $\mu$m to 700 $\mu$m, the portion around the spacing formed by the bubbles of inert gas, etc., is ground, and thus by-products of fine powders (for example, a particle size of not more than 150 $\mu$m) or scaly fragments may be formed in a large amount besides the water-absorbent particles.

These by-products of fine powders, scaly fragments have high surface area to volume ratio, and thus have higher liquid absorbing rate as compared to the water-absorbent particles. Therefore, for example, in the case of uniformly mixing the surface treatment, these sub-products may absorb the surface treatment quickly which makes it difficult to uniformly apply the surface treatment onto the surface of water-absorbent particles. Furthermore, fine powders or scaly fragments having absorbed therein the surface treatment may agglomerate in a bulk, and a heating treatment to be applied to the water-absorbent particles after having applied thereto the surface treatment may not be performed desirably.

As a result of grinding after being dried, protrusions and recessions appear on the surface of the water-absorbent particles due to the bubbles of inert gas. The protrusions and recessions as appeared onto the surface are likely to be scraped, which may cause the formation of fine powders in other processes than grinding, or degrading of properties of the water-absorbent particles. More specifically, for example, when preparing water-absorbent particles (including transport process, etc.,) or processing water-absorbent particles (or water-containing gel) into water-absorbent material for use in paper diaper, 1) the surface which suffers from the process damage may be scraped, fine powders may be generated, or the surface treatment layer having applied thereto a surface treatment may be broken, or 2) properties of water-absorbent particles such as absorbency under pressure, permeability of swelled gel (water-absorbent particles having water absorbed therein) may be lowered. Furthermore, fine powders resulting from the grinding process or other processes may lower the operability. It is important to suppress an occurrence of such problem particularly when adopting the static polymerization in which a polymerization is likely to take place in a state where the monomer solution contains uncountable number of bubbles, such as the case of supplying a monomer solution onto the surface of the belt being driven, to continuously polymerize the monomer on the belt.

(3) Control of Polymerization Temperature

Changes in pattern of reaction temperatures in the polymerization reaction of the monomer are greatly affected even with slight changes in conditions, such as 1) a ratio of residual dissolved oxygen in the case of supplying a monomer in a form of aqueous solution (hereinafter referred to as an aqueous monomer solution) to a polymerization reaction, 2) thickness or initial temperature of the aqueous monomer solution fed on the transport belt, 3) set cooling or heating temperature of the monomer supplied to the polymerization reaction, 4) an amount of supply of a polymerization initiator, etc.

As described, the timing of the polymerization peak and the peak temperature at the polymerization peak are varied even with small changes in conditions. Therefore, even when adopting a manufacturing device provided with a heater for heating a reaction system for a predetermined period after a predetermined period of cooling treatment, water-absorbent polymers having desirable properties may not be obtained, or desirable productivity may not be obtained under stable conditions.

For example, in the case where an actual peak temperature is higher than expected, an excessive increase in the reaction temperature may not be fully suppressed even after the predetermined period of cooling treatment. Similarly, in the case where the timing of the polymerization peak appears at a later timing than expected, a predetermined period of the heating treatment may start being applied to the monomer before reaching the polymerization peak, and as indicated by (D) in FIG. 8, the reaction temperature increases excessively. Furthermore, in the case where an actual peak temperature is lower than expected, the polymerization reaction may not be performed to the sufficient level.

In an event of unexpected polymerization reaction, for example, as above-listed, the following problems would typically occur: 1) the water-containing gel is bursted or bumped out of the polymerization device in the middle of the polymerization reaction, 2) the water-containing gel adhering onto the transport means such as transport belt cannot be separated with ease, or 3) degrading of respective properties of a water-absorbent polymer as a final product occurs, or the like. Sometimes, however, it is difficult to determine from the appearance of the water-absorbent polymer whether or not degrading of respective properties occurs, i.e., whether or not an expected polymerization reaction is being performed. Therefore, in practice the respective properties of the water-absorbent polymer are confirmed by a physical property test to be performed with respect to final products after subjecting the polymerized water-containing gel to drying or (fine) grinding. For this reason, according to the described manufacturing method of the water-absorbent polymer using the described manufacturing device for water-absorbent polymers, such problem that a polymerization reaction may be continued for a long time without noticing an occurrence of abnormality, and a large amount of inferior water-absorbent polymer may be produced, resulting in the wasting of monomers as a raw material.

(4) Transportation of Water-Containing Gel

Generally, the resulting water-containing gel is viscous, and for this viscosity, the water-containing gel is liable to adhere to the support face of the transport means when transporting the water-containing gel in and out from the polymerization device to the gel grinder, and thus factors which hinder the water-containing gel from being transported smoothly such as the water-containing gel being entrapped, clogged, buckled, rolled in, etc., may occur. As a result, the water-containing gel may be cracked or cut as being extended. Further, 1) from the cracked or cut portion, the water-containing gel is liable to be rolled in between guide rolls or rotation rolls, or 2) the cracked or cut portion of the water-containing gel is liable to be clogged at the supply port of the gel grinder. Thus, a smooth transportation of the water-containing gel becomes more difficult.

Specifically, 1) when transporting the water-containing gel from the endless belt to the guide rolls, rotation rolls, a roller conveyer, etc., the water-containing gel adhering to the support face of the endless belt is difficult to be separated, which hinders the water-containing gel from being transported smoothly. 2) Also, in the case of transporting the water-containing gel on the guide rolls, rotation rolls, roller conveyer, etc., the water-containing gel is liable to adhere to the support face of the guide rolls or the rotation rolls, and the portion adhering to the support face may be rolled in a spacing between rolls, which hinders the water-containing gel from being transported smoothly. Particularly, in the case of performing a static polymerization of a water-soluble ethylenically unsaturated monomer, polymerization may be delayed (or uncompleted) in some parts, for some reasons. In this event, such parts possibly have extremely high viscosity, and thus would hinder the water-containing gel from being transported smoothly as being adhered to the support face of the transport means.

Furthermore, it is time consuming and troublesome to remove the entrapped or clogged portion of the water-containing gel. Particularly, in the case of performing a polymerization of a water-containing monomer (aqueous monomer solution) in a continuous manner, it may be necessary to terminate the entire operation of the manufacturing device including post-processing (drying, grinding, surface treatment, etc.).

SUMMARY OF THE INVENTION

An object of the present invention is to provide a method of manufacturing water-containing polymers having desirable properties in a continuous manner under stable conditions.

In order to achieve the above object, a continuous manufacturing method of a water-absorbent polymer by continuously performing a polymerization of a hydrophilic monomer using a solution containing a hydrophilic monomer, is characterized by including at least one of the following steps (A) to (D):

(A) introducing an inert gas into the solution in a continuous manner before subjecting the solution to a polymerization reaction, and subsequently removing the inert gas from the solution;

(B) supplying the solution to a polymerization process, and washing out the solution with water supplied before, at, or after a timing of supplying the solution to the polymerization process;

(C) detecting reaction temperatures of a polymerization reaction in non-contact manner at a plurality of points different distances away from a point where a solution is supplied; and (D) supplying water to a water-containing gel and/or transport means when transporting the water-containing gel of the water-absorbent polymer obtained in or after the polymerization reaction.

According to the described method of the present invention, an occurrence of a trouble in a continuous manufacturing process of a water-containing gel of a water-absorbent polymer or necessity of terminating the manufacturing process can be avoided, and by overcoming deficiencies of the conventional method, water-absorbent polymers can be manufactured in a continuous manner under stable conditions.

Specifically, according to the method including the step (A), a polymerization reaction is performed with respect the monomer solution having undergone removal of inert gas introduced for the purpose of deaeration (removing oxygen). Therefore, as compared to the case of the conventional method, an amount of bubbles remaining in the solution can be reduced, thereby manufacturing a water-absorbent polymer which shows excellent handling efficiency and desirable properties.

According to the method including the step (B), water is supplied to an area (inner surface of a mixing column for mixing a polymerization initiator, etc.) where the solution contacts when supplying the solution containing a hydrophilic monomer. Therefore, unwanted adhesion and the retention of the solution or the adhesion and matured of the polymer of the hydrophilic monomer can be prevented. Namely, according to the method including the step (B), water-absorbent polymers can be manufactured in a continuous manner always under desirable conditions. Here, "polymerization process" indicates a process of performing a crosslinking polymerization by improving a polymerization ratio of the monomer solution or water-containing gel at temperatures above room temperature, that is a process of maturing the water-containing gel. By carrying out this polymerization process, generally, a polymerization ratio of not less than 95 percent, or a not less than 99 percent or even not less than 99.9 percent can be achieved. Here, the polymerization process and (a part of) the drying process can be performed at the same time by evaporating in the polymerization reaction.

According to the method including the step (C), reaction temperatures of the polymerization reaction are detected (measured) over time, and a change pattern of the reaction temperatures can be monitored. As a result, whether or not an expected polymerization is being carried out can be determined in an early stage. Especially, by monitoring a change pattern of reaction temperatures around the peak temperature or in the second half of the polymerization reaction, reaction temperature(s) in the second half of the polymerization reaction, the peak temperature, or the timing of polymerization peak (peak timing) can be seen, and whether or not an expected polymerization is being carried out can be determined in an early stage under stable conditions.

According to the method including the step (D), such problem that the water-containing gel of the water-absorbent polymer adhering to the support face of the transport means can be prevented. Moreover, even the water-containing gel which has been adhered to the support face can be released therefrom. As a result, an occurrence of factors which hinder the water-containing gel from being transported smoothly can be prevented or suppressed. As a result, the problem of the water-containing gel being cracked or cut as being extended in the transportation process can be prevented, thereby permitting a continuous polymerization of water-absorbent polymers.

For a fuller understanding of the nature and advantages of the invention, reference should be made to the ensuing detailed description taken in conjunction with the accompanying drawings.

DESCRIPTION OF THE EMBODIMENTS

First Embodiment

Figure 1:
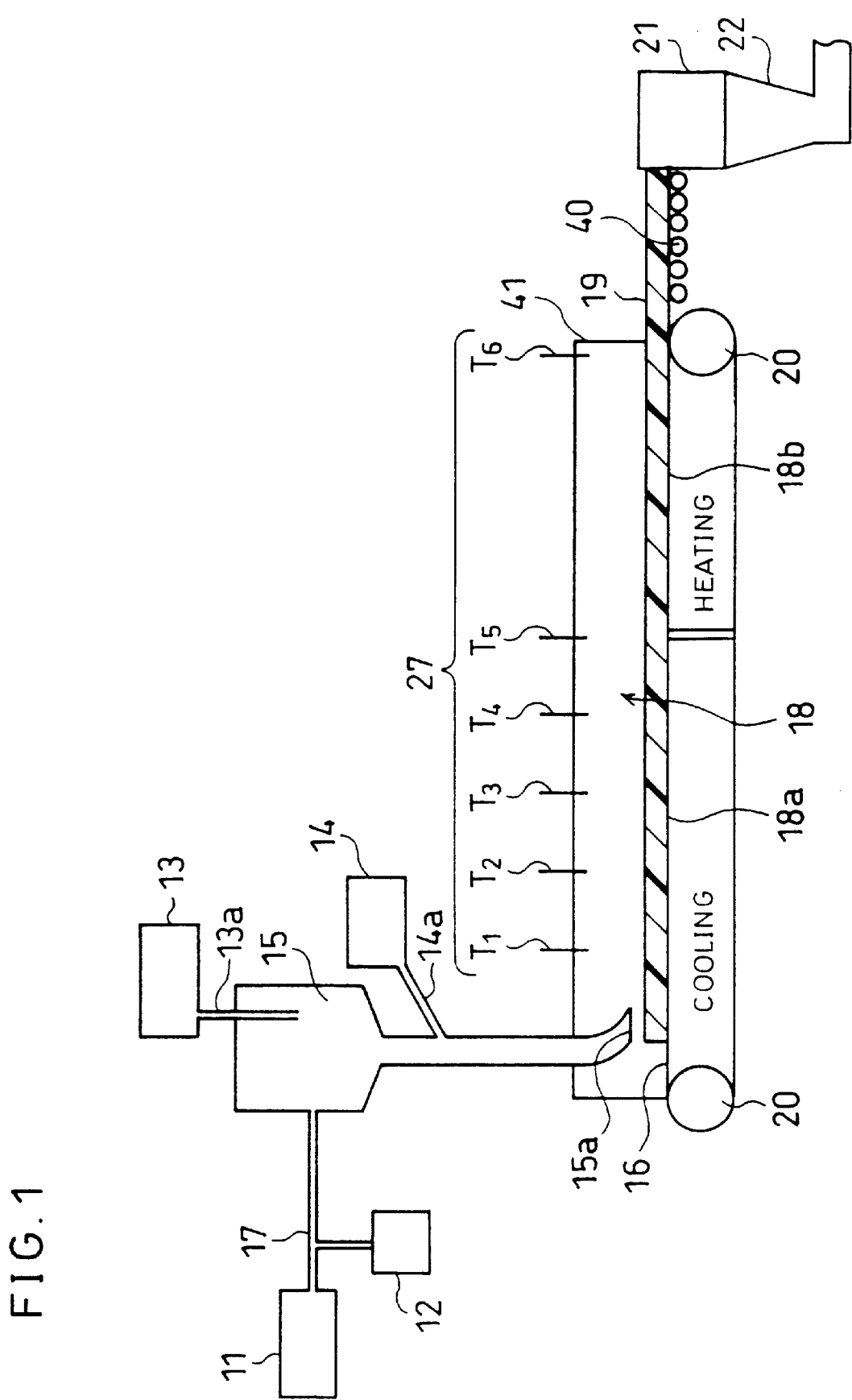
FIG. 1 shows a schematic structure of one example of a manufacturing device of a water-absorbent polymer for use in a manufacturing method of the present invention.

A continuous manufacturing method of a water-absorbent polymer in accordance with the present invention by continuously performing a polymerization of a hydrophilic monomer using a hydrophilic monomer containing solution, includes at least one of the following steps (A) to (D):

(A) introducing an inert gas into the solution in a continuous manner before subjecting the solution to a polymerization reaction, and subsequently removing the inert gas from the solution (hereinafter referred to as step (A));

(B) supplying the solution to a polymerization process, and washing out the solution with water supplied before, at, or after a timing of supplying the solution to the polymerization process (hereinafter referred to as step (B));

(C) detecting reaction temperatures of a polymerization reaction in non-contact manner at a plurality of points different distances away from a point where the solution is supplied (hereinafter referred to as step (C)); and (D) supplying water to a water-containing gel and/or transport means when transporting the water-containing gel of the water-absorbent polymer obtained in or after the polymerization reaction (hereinafter referred to as step (D)).

In the above step (B), "polymerization process" indicates a process of performing a crosslinking polymerization by improving a polymerization ratio of the monomer solution or water-containing gel at temperatures above room temperature, including a process of maturing the water-containing gel. By carrying out this polymerization process, generally, a polymerization ratio of not less than 95 percent, or not less than 99 percent, or even not less than 99.9 percent can be achieved. Here, the polymerization process and (a part of) the drying process can be performed at the same time by evaporating in the polymerization reaction.

In order to improve handling efficiency and respective properties of water-absorbent polymer, it is preferable that the continuous manufacturing method of a water-soluble polymer of the present invention includes at least any of the above steps (A), (C) or (D). Among these steps, the steps (A) and (C) are preferable over (D), and between the steps (A) and (C), the step (C) is preferable over (A) for the above propose. It is more preferable that the method of the present invention includes at least two of the above steps (A) to (D), for example, the step (C) and the step (D), and still more preferably includes at least three of the above steps, and most preferably includes all of the above four steps (A) to (D). In the case of performing all of the steps (A) to (D), in practice, the steps (A) to (D) are performed in this order. In the present invention, "water-absorbent polymer" unless specified otherwise indicates a general term including water-containing gel produced by polymerizing "hydrophilic monomer" (to be described later), pulverized gel obtained by grinding and/or drying the water-containing gel, water-absorbent particles, and water-absorbent fine particles.

The above-defined water-absorbent polymer is a water-swelling and water-insoluble hydrophilic crosslinked polymer having an absorbency of generally not less than 5 times of its own weight, preferably 10 to 2000 times, and more preferably 100 to 1000 times, with respect to an ion exchanged water.

In the present invention, "hydrophilic monomer" is not particularly limited, and any hydrophilic monomer can be adopted, provided it can be used as a raw material of a water-absorbent polymer. However, those having a solubility of not less than 5 percent by weight with respect to water at 25° C. are preferable, and those having a solubility of not less than 10 percent by weight are more preferable, and those having a solubility of not less than 20 percent by weight are especially preferable. Non-limiting examples of such hydrophilic monomer include: anionic unsaturated monomers, such as acrylic acid, methacrylic acid, maleic acid, vinyl sulfonic acid, styrene sulfonic acid, 2-(meth)acrylamide-2-methylpropanesulfonic acid, 2-(meth)acryloylethanesulfonic acid, 2-(meth)acryloylpropanesulfonic acid, and salts thereof; unsaturated monomers having a nonionic hydrophilic group such as acrylamide, (meth)acrylamide, N-ethyl (meth)acrylamide, N-n-propyl(meth)acrylamide, N-isopropyl(meth)acrylamide, N,N-dimethyl (meth)acrylamide, 2-hydroxyethyl(meth)acrylate, 2-hydroxypropyl(meth)acrylate, methoxypolyethylene glycol(meth)acrylate, polyethylene glycol mono(meth)acrylate, vinylpyridine, N-vinylpyrrolidone, N-vinylacetoamide, N-acryloyl piperidine, N-acryloylpyrrolidine, etc.,; cationic unsaturated monomers such as N,N-dimethylaminoethyl(meth)acryalte, N,N-diethylaminoethyl(meth)acryalte, N,N-dimethylaminopropyl(meth)acrylate and N,N-dimethylaminopropyl(meth)acrylamide, and quaternary salts thereof; ring opening polymerizable monomers such as oxazorine of the above cationic unsaturated monomers having a nitrogen atom, etc. Among the above-listed monomer examples, acrylic acid and salts thereof (particularly alkaline metal salts such as Li, Na, K, etc., ammonium salts, are suitable) as essential raw material. Only one kind of the above-listed hydrophilic monomers may be adopted, or two or more kinds thereof may be suitably mixed and adopted in a polymerization reaction. Hereinafter, the hydrophilic monomers may be simply referred to as monomers.

The hydrophilic monomers of the present invention include those which generally show lower hydrophilicity than the above-listed monomers but can be used as a raw material of a water-absorbent polymer, non-limiting examples of which include: acrylonitrile, methyl acrylate, ethyl acrylate, methyl methacrylate, ethyl methacrylate, etc.

In the case of using a mixture of acrylic acid and a monomer containing an acid group such as alkyl metal salt thereof (or ammonium salt) as a monomer, the neutralization degree of the water-absorbent polymer as final product (that is almost equal to the neutralization degree of monomer= number of moles of alkyl metal salt (or ammonium salt) of acrylic acid/number of moles of entire monomer×100 (%)) is not particularly limited but preferably in a range of from 0 percent to 90 percent, and more preferably in a range of from 0 percent to 80 percent.

The neutralization degree of the water-absorbent polymer can be adjusted by altering the ratio between acrylic acid and alkyl metal salt thereof (or ammonium salt) as a monomer to be polymerized. This neutralization degree of the resulting water-absorbent polymer can be adjusted also after the polymerization reaction. Specifically, for example, in the case of adopting a monomer with neutralization degree in a range of from 0 percent to 50 percent, the neutralization degree can be adjusted to be, for example, in a range of from 55 percent to 80 percent by treating the resulting water-absorbent polymer (water-containing gel) from the polymerization reaction with carbonate or hydroxide of alkyl metal (or ammonium).

In the above polymerization reaction, a crosslinking agent may be used as necessary. Such crosslinking agent is not particularly limited, provided it has not less than two functional groups in a molecule, and contributes to the formation of crosslinked structure. By performing the polymerization reaction in the presence of the crosslinking agent, a water-absorbent polymer which shows excellent durability can be achieved. In some cases, the crosslinked structure may be formed by adding a crosslinking agent to the water-containing gel (one type of water-absorbent polymer) resulting from the polymerization reaction. In this case, it is preferable to use a crosslinking agent having at least two groups in a molecule reactive to a functional group such as carboxyl group, etc., of the water-containing gel. Examples of the groups reactive to the functional group includes an epoxy group, an amino group, a hydroxyl group, etc.

In order to adopt the crosslinked structure, the water-absorbent polymer of the present invention may be of a self-crosslinking type which does not require a crosslinking agent, but is more preferably obtained by copolymerizing or reacting an internal crosslinking agent containing at least two polymerizable unsaturated groups or at least two reactive groups.

Non-limiting examples of the internal crosslinking agent include: N,N'-methylenebis(meth)acrylamide, (poly)ethylene glycol di(meth)acrylate, (poly)propylene glycol di(meth)acrylate, trimethylolpropane tri(meth)acrylate, trimethylolpropane di(meth)acrylate, glycerol tri(meth) acrylate, glycerolacrylate(meth)acrylate, ethylene oxide denatured trimethylolpropane tri(meth)acrylate, pentaerythritoltetra(meth)acrylate, dipentaerythritolhexa (meth)acrylate, triallylcyanurate, triallylisocyanurate, triallylphosphate, triallylamine, poly(meth)allyloxyalkane, (poly)ethylene glycol diglycidylether, glyceroldiglycidylether, ethylene glycol, polyethylene glycol, propylene glycol, glycerol, pentaerythritol, ethylenediamine, polyethyleneimine, glycidyl(meth)acrylate, etc.

Only one kind of the above-listed internal crosslinking agents may be adopted, or two or more kinds thereof may be suitably mixed and adopted. Among all, to attain a higher absorbency under pressure of the resulting water-absorbent polymer, it is preferable to use an internal crosslinking agent of a compound having not less than two polymerizable unsaturated groups, in an amount from 0.005 to 5 mol percent, more preferably in an amount from 0.01 to 2 mole percent, and still more preferably in a range of from 0.05 to 0.5 mole percent based on the monomer component.

For that polymerization, a hydrophilic polymer compound such as starch, cellulose, derivative of starch, derivative of cellulose, polyvinyl alcohol, polyacrylic acid (salt), a crosslinked polyacrylic acid, and crosslinked polyacrylate salt; a chain transfer agent such as hypophosphorous acid and hypophosphite; chelating agents; a water-soluble or water-dispersable surface active agent may be added in the polymerization reaction.

The above monomer can be used in a polymerization reaction in a form of a solution containing the monomer (hereinafter referred to as a monomer solution). For the monomer solution, an aqueous monomer solution is preferable. The concentration of the aqueous monomer solution is not particularly limited and the solution in which monomer is dispersed above saturated concentration may be adopted. However, the concentration of the aqueous monomer is preferably in a range of from 20 percent by weight to saturated concentration, more preferably in a range from 30 percent by weight to 45 percent by weight. For the concentration of not less than 20 percent by weight, practical level of the gel strength of the resulting absorbent polymer can be ensured. Similarly, for the concentration of not more than the saturated concentration, the polymerization reaction can be surely controlled, for example, the heat generated from the polymerization reaction can be removed with ease, and bumping and an increase in soluble components contained in the resulting water-absorbent polymer can be prevented. Needless to mention, the concentration of the aqueous monomer solution is limited also by the temperature of the monomer or the solubility of hydrophilic monomer to water.

Firstly, the step (A) will be explained. The step (A) includes the process of continuously supplying an inert gas into the monomer solution and subsequently removing the inert gas supplied to the solution before subjecting the monomer solution to the polymerization reaction, i.e., before starting the polymerization reaction of the hydrophilic monomer.

The above step (A) is one step in the manufacturing process of water-absorbent polymer wherein the hydrophilic monomer is polymerized using a solution containing a hydrophilic monomer (monomer solution). It is preferable that this step (A) includes, for example, the steps of 1) supplying inert gas into the solution before subjecting the solution to the polymerization reaction and 2) removing the inert gas supplied to the solution by applying ultrasonic to the solution and/or generating circulating flow of the solution.

As described, in the step (A), first, inert gas is supplied to the monomer solution before subjecting the monomer solution to the polymerization reaction, and the oxygen dissolved in the monomer solution is removed therefrom. The inert gas is removed as described above for the purpose of suppressing the effect of oxygen dissolved in the solution on the polymerization reaction. The inert gas to be supplied to the monomer solution is not particularly limited, and any inert gas which is not reactive with the above-explained monomer can be used. Preferable examples of such inert gases to be supplied to the monomer solution include: nitrogen gas, argon gas, helium gas, etc., and in some cases, carbon dioxide gas.

The method of supplying inert gas into the monomer solution is not particularly limited, and non-limiting examples of which includes 1) a (continuous supply) method of continuously jetting inert gas (or monomer solution) into a flow of the monomer solution (or inert gas) by spraying inert gas (or monomer solution) through a nozzle by an ejector or an aspirator; 2) a method of introducing inert gas into the monomer solution stored in a monomer tank through an inlet tube for an inert gas. Between the above two methods, the method 1) is more suited for a continuous manufacturing method. Only one of the above methods may be adopted, or two or more methods may be suitably mixed and adopted. The removal ratio of dissolved oxygen from the monomer solution is not particularly limited. However, the amount of oxygen remaining in the monomer solution is preferably not more than 2 mg/l, more preferably not more than 1 mg/l, and still more preferably not more than 0.5 mg/l.

The monomer solution having inert gas supplied by the foregoing method contains inert gas in replace of oxygen. Hereinafter, explanations will be given on the process of removing inert gas from the monomer solution (a part of step (A)).

The step of removing inert gas specifically indicates the step of deaerating bubbles of inert gas or dissolved inert gas from the solution. The removal ratio of the inert gas is not particularly limited as long as aggressively removing the inert gas from the monomer solution as compared to the case of leaving the monomer solution as it is without treatment. By carrying out the forgoing deaeration treatment, the residual oxygen, etc., in the solution can be removed at the same time.

The amount of inert gas contained in the monomer solution can be measured directly. However, as will be explained later, the amount of residual inert gas may be measured indirectly by measuring the transmittance of light of the resulting water-absorbent polymer (water-containing gel) as a final product. Such water-containing gel having uncountable number of bubbles (with a particle diameter of from several $\mu$m to several hundreds of $\mu$m), shows low light transmittance due to the bubbles, and is turbid in white color with low transparency. Measuring the amount of residual inert gas by the light transmittance of water-containing gel as a final product, the light transmittance is preferably not less than 10 percent, more preferably not less than 20 percent, and still more preferably not less than 50 percent.

The method of removing the inert gas from the monomer solution to be carried out prior to the polymerization specifically includes at least one of the following methods: 1) a method of applying ultrasonic to the monomer solution, 2) a method of generating circulating flow of the monomer solution; 3) a method of subjecting the monomer solution under circumstances of reduced pressure; 4) a method of heating the monomer solution to a level at which a polymerization reaction does not take place; and 5) a method of adding defoaming agent to the monomer solution, etc. Only one of the above methods may be adopted, or two or more methods may be suitably mixed and adopted. Among the above methods 1) to 5), the methods 1) and 2) are preferable, and between the methods 1) and 2), the method 1) is more preferable. The described methods are to be performed by a device separately provided from the polymerization device.

The above method 1) specifically indicates a process of applying ultrasonic to the monomer solution by means of an ultrasonic generating device (gas removing means) before the polymerization reaction, particularly, before supplying a monomer solution to the polymerization device. The frequency of sonic is not particularly limited as long as not less than 20 kHz, but preferably in a range of from 25 kHz to 60 kHz. For the frequency of not less than 25 kHz, finely dispersed inert gas contained in the monomer solution in a form of bubbles can be prevented. On the other hand, the ultrasonic having frequency below 20 kHz is known to be undesirable as bubbles are finely dispersed in the monomer solution. There is no particular upper limit for the frequency of the ultrasonic; however, those having a frequency up to 60 kHz is industrially available.

There is no particular condition for the monomer solution which permits the application of ultrasonic, and the ultrasonic can be applied in any state of the monomer solution without being limited to the state a where a) a flow of the monomer solution is not flown, or a state where b) the monomer solution flows after deaeration. The state a) specifically indicates, for example, the state in which the monomer solution having bubbles dispersed therein after deaeration are stored in the container or temporarily introduced into an ultrasonicating bath for sonicating, etc. The state b) specifically indicates, for example, the state in which the monomer solution is supplied successively for the polymerization.

The application time of the ultrasonic in the above state a) is not particularly limited, but preferably in a range from 1 seconds to 10 minutes in a range of from 2 seconds to 5 minutes, and more preferably in a range of from 1 to 3 minutes. By setting the application time to be not less than 1 second, bubbles of the inert gas contained in the monomer solution can be removed desirably. Further, by setting the application time to be not to be more than 10 minutes, an occurrence of such problem that a polymerization reaction is induced by a temperature rise of the monomer solution by the energy generated from the application of ultrasonic can be avoided.

Similarly, the ultrasonic application time is not particularly limited in the above state b), the foregoing examples on the ultrasonic application time given for the state a) can be applied to the state b). In some cases, however, it is preferable to control the monomer solution to flow slowly or to provide a plurality of ultrasonic generating devices along a direction the monomer solution flows in order to ensure the application time of ultrasonic.

The timing at which the ultrasonic is applied onto the monomer solution is not particularly limited, provided the inert gas can be removed from the monomer solution (or from the reaction system containing the monomer solution after the start of the polymerization reaction). However, it is more preferable to apply the ultrasonic to the monomer solution at a predetermined timing in the period from directly after a timing of introducing the inert gas into the monomer solution to a start timing of the polymerization reaction (in the case of adopting a polymerization initiator, before mixing the initiator (for redox initiator, mixture of the oxidization initiator and a reducing agent) into the monomer solution), and still more preferably directly before the start timing of polymerization reaction.

Figure 2:
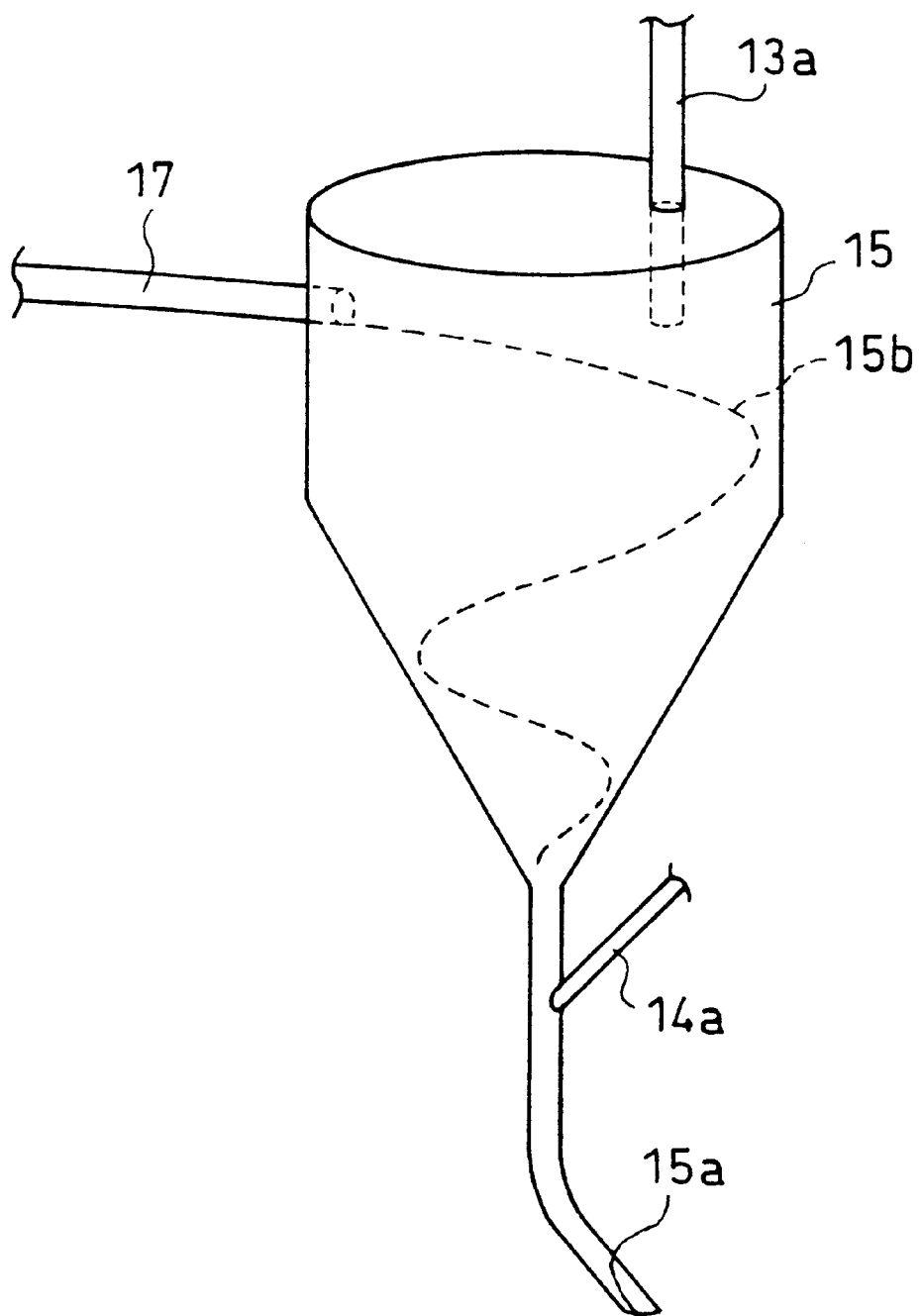
FIG. 2 is an enlarged view showing a schematic structure of a mixing column (serving also as cyclone room) provided in the manufacturing device of FIG. 1.

The above method 2) specifically indicate the process of introducing the monomer solution to, for example, the cyclone room (gas removing means) shown in FIG. 2, and generating a circulating flow of the monomer solution. According to this method, the monomer solution is introduced in the Cyclone room as indicated by a spiral line 15b, so as to generate a circulating flow, and by a centrifugal force generated from the circulating flow, bubbles of inert gas can be separated from the monomer solution. Additionally, the monomer solution is formed in a thin film on the line 15b, and thus the deaeration can be accelerated. Here, gas removing means other than the above examples of the cyclone room may be adopted for the described method 2), provided a circulating flow of the monomer solution can be formed.

The timing of generating the circulating flow of the monomer solution is not particularly limited, provided the inert gas can be removed from the monomer solution (or reaction system containing the monomer solution after the polymerization reaction). However, it is preferable that the circulating flow generates at a predetermined timing in a period from directly after a timing of introducing the inert gas to the monomer solution to a start timing of the polymerization reaction. For example, in the case where the cyclone room serves also as a mixer for mixing the monomer solution with the initiator of the polymerization reaction, in some cases, the circulating flow generates in the initial stage of the polymerization reaction.

The method 3) specifically indicates the process of, before supplying the monomer solution having undergone continuous deaeration to the polymerization device, supplying the monomer solution placed in a closed system or a system similar to the closed system (hereinafter simply referred to as a closed system or the like) under circumstances of reduced pressure. For the closed system or the like, generally, a part of the manufacturing device of the water-absorbent polymer can be used as it is. However, as necessary, a separately provided device for removing bubbles of the inert gas may be adopted. The environment of reduced pressure indicates that the environment under which the normal atmosphere of gas in contact with the monomer solution in closed system is not more than atmospheric pressure. Such pressure is preferably in a range of from 0.1 kPa to 50 kPa, more preferably in a range of from 0.5 kPa to 10 kPa. Such environment of reduced pressure can be achieved, for example, by discharging air out of the closed system using a vacuum pump, etc., or cooling the air inside the closed system, etc. However, the method of forming the environment under reduced pressure is not limited to the above methods.

When placing the monomer solution containing the inert gas under environment of reduced pressure, the inert gas in a form of bubbles or the dissolved inert gas in the monomer solution is released from the monomer solution to a spacing in the closed system. This is because an equilibrium movement occurs for the compensation of the loss from normal pressure in the closed system when preparing environment of reduced pressure.

When cooling the gas in the closed system, the monomer solution in contact with the gas may be cooled together. Therefore, depending on how far the monomer solution is cooled, there might be a possibility that the solubility of the inert gas in the monomer solution increases. In view of the forgoing, the method of discharging gas from the closed system or the like using vacuum pump is preferable among the above-exemplified method of forming environment of reduced pressure.

The timing of placing the monomer solution in the environment of reduced pressure is not particularly limited provided the inert gas can be removed from the monomer solution (or reaction system containing monomer solution after the start of polymerization reaction). However, it is preferable that the monomer solution is placed in the environment of reduced pressure at a predetermined timing in a period from directly after a timing of introducing the inert gas to the monomer solution to a start timing of the polymerization reaction, and more preferably at timing directly before the start timing of the polymerization reaction. The monomer having undergone deaeration process is placed back in the atmosphere of normal pressure, and is then supplied into the polymerization device or subjected to the polymerization reaction.

The method 4) specifically indicates the process of heating the monomer solution after having gone through the continuous deaeration to an extent that a polymerization reaction does not occur. Upon heating the monomer solution containing the inert gas in the foregoing manner, the inert gas dissolved or in a form of bubbles in the monomer solution is removed from the monomer solution to be released into the space within the closed system. This is because the inert gas solubility in the monomer solution is reduced with an application of heat.

It is preferable that the above heating treatment is applied to the monomer solution at a predetermined timing in a period from directly after a timing of introducing the inert gas to the monomer solution to a start timing of the polymerization reaction, and more preferably at timing directly before the start timing of the polymerization reaction.

Upon heating the monomer solution, for example, the gas inside the closed system is heated indirectly, and the pressure is increased. Therefore, the gas as heated may be dissolved in the monomer solution. However, generally, this would not be a problem, provided, the heating treatment is applied to a level a polymerization reaction does not take place.

The method 5) specifically indicates the process of removing bubbles in inert gas by adding defoaming agent such as a surface active agent, etc., to the monomer solution.

According to the method of the present invention, generally, a polymerization reaction is performed in a continuous manner by continuously supplying the monomer solution (continuous system). Generally, the deaeration is also performed in a continuous manner. In the static polymerization, it is more liable to proceed a polymerization reaction in the state where the monomer solution contains bubbles than the stirring polymerization. Therefore, it is more preferable to adopt the static polymerization in the method of the present invention. Namely, it is especially preferable that the polymerization reaction of the present invention is a continuous static polymerization as particular effects as achieved from the present invention can be most appreciated. In the case where the inert gas removal process is performed by the method of applying ultrasonic to the monomer solution, and/or by the method of generating circulating flow of the monomer solution, the polymerization reaction may be carried out in a batch manner at every predetermined amount of monomer solution. In the state directly before being supplied to the polymerization reaction, the inert gas may have been removed from the monomer solution as above explained, or may not have been removed from the monomer solution.

As described, according to the method including "the step (A) of removing inert gas from the monomer solution", an amount of bubbles of inert gas in the resulting water containing gel or a water-absorbent polymer after being dried can be reduced or even eliminated as compared to that resulting from the conventional manufacturing method. This reduces the formation of protrusions and recessions formed on the surface of the water-absorbent polymer or granulated water-absorbent polymer, due to the inert gas bubbles. As a result, water-absorbent polymer having excellent handling efficiency and desirable properties can be produced.

As necessary, the resulting water-absorbent polymer (water-containing gel) from the described manufacturing method may be further subjected to granulating process by means of gel granulator; (fine) pulverizing process by means of gel pulverizer; drying process by means of dryer; (fine) grinding process after being dried by means of mill-type grinder, etc. Generally, the above granulating process is essentially performed in the static polymerization. The described granulating, pulverizing, drying and grinding processes are generally performed in this order when all of these processes are to be performed.

As a result of performing the drying process, granulating process, etc., generally, fine powders (in a size of, for example, not more than 150 $\mu$m, or not more than 100 $\mu$m) or scaly fragments are formed as by-products. These fine powders and scaly fragments have large surface areas with respect to their volumes, and thus quickly absorb, for example, a surface treatment. Therefore, it is difficult to uniformly apply the surface treatment onto the surface of water-absorbent particles (for example, having an average particle diameter of from 200 $\mu$m to 700 $\mu$m), etc. Further, the fine powders and scary fragments having absorbed therein the surface treatment may be aggregated into a bulk, which causes the problem that the process of heating the water-absorbent particles mixed with the surface processing agent cannot be performed desirably, resulting in degrading of respective properties and reduction in yield.

However, the water-absorbent polymers (water-containing gel) as produced by the manufacturing method of the present invention have reduced amount of bubbles (inert gas, etc.) as compared to the conventional manufacturing method, or contain no such residual bubbles of inert gas. Therefore, when manufacturing the water-absorbent particles (one type of water-absorbent polymer), etc., an amount of fine powders, or scary fragments to be generated in grinding process after drying as sub-products can be reduced from that achieved from the conventional method. Therefore, for example, a surface treatment can be applied to water-absorbent particles by uniformly applying the surface treatment, and the process of heating the water-absorbent material mixed with the surface processing agent can be performed desirably. Additionally, formation of protrusions and recessions on the surface of water-absorbent particles due to bubbles can be suppressed by reducing the residual bubbles of inert gas, and thus as compared to those produced by the conventional method, the problem of the layer treated with the surface treatment being damaged by a process damage is less likely to occur, and desirable properties in their absorbency under pressure, liquid permeability, etc., can be achieved.

Prior to supplying the monomer for the polymerization reaction, and the polymerization reaction of the monomer starts, it is preferable to perform the step (step (B)) of introducing the monomer solution in a container such as a mixing column for mixing a polymerization initiator (to be explained in details later), a polymerization section (polymerization device, polymerization zone) provided with an endless belt, etc., and further washing out the solution with water as supplied at, before, or after the timing of introducing the monomer solution. Hereinafter, this process is referred to as process (B). The following will explain the step (B).

The method of introducing the hydrophilic monomer adopted in the step (B) for introducing the solution containing a hydrophilic monomer (monomer solution) into the container, the polymerization section, or the like includes the step of supplying water to at least a part of an area of 1) the container, 2) the inlet tube for supplying the solution to the polymerization section, where the solution contacts, before at or after the timing of supplying the solution to the container or the polymerization section. In other words, the above step (B) includes the step of when supplying the solution containing a hydrophilic monomer, supplying water to at least a part of an area the solution contacts before, after, or at the timing the solution contacts the area. By supplying water in the foregoing manner, the area the solution contacts can be lubricated, and adhesion or retention of the solution in the area can be prevented.

For the container, any hollow ware having a supply port for introducing therethrough the monomer solution and a discharge port for discharging therefrom the monomer solution may be adopted, and the shape, or the like of the container is not particularly limited. Therefore, for example, a hollow ware having the same cross sections and the areas along from the inlet port, the main body to the discharge port may be adopted. Unlimited examples of the above container include: 1) a container having such shape that the smallest area of the container, surrounded by a cross line between the inner surface of the container and a horizontal plane is positioned on the plane including the discharge port, and 2) a container having such shape that the smallest area of the container surrounded by a cross line between the inner surface of the container and a horizontal plane is positioned below a plane including the supply port and above a plane including the discharge port. Concrete examples for the above containers 1) and 2) include: a mixing vessel for mixing the monomer solution with the polymerization initiator, a deaerator such as cyclone room for removing the inert gas supplied to the monomer solution.

The polymerization section includes means which enables a polymerization of a monomer by a continuous manner or a batch manner. In the continuous polymerization, this means can be transport means such as a transport belt (preferably endless belt), a drum dryer, or the like which performs a static polymerization of the monomer solution in a continuous manner by continuously supplying the monomer solution on the upper surface of the transport means. In the batch-wise polymerization, this means can be a polymerization container such as stainless tray, pipe, tank or the like. In either case, the introduction of the monomer solution into the polymerization section is performed through the inlet tube.

As described, the step (B) of supplying the hydrophilic monomer includes the step of supplying water to 1) the container or 2) at least a part of an area the monomer solution contacts of the container, such as the inlet tube, etc., for introducing the monomer solution to the polymerization section.

For the container, the area the monomer solution contacts indicates an inner surface of the container. For the inlet tube, the area the monomer solution contacts indicate both inner and outer surfaces of the inlet tube. Here, the contact of the monomer solution includes the case in which the monomer solution contacts the area by its scattering.

The described step of supplying water is performed 1) before the monomer solution contacts the area or 2) at the timing the monomer solution contacts the area. In some cases, this step can be performed 3) after the monomer solution contacts the area, and in this case, the monomer solution adhering the area is to be washed out. Namely, the above step can be performed at any of the described timings 1) to 3), or any two of 1) to 3) may be selected. In the case of supplying water at the timing 1), a film of water can be formed before the monomer solution contacts the area, and adhesion and retention of the monomer solution in the area can be prevented. In the case of supplying water at the timing 2), the monomer solution contacting the area can be removed from the area together with water. In the case of supplying water at timing 3), the monomer solution adhering to the area can be removed therefrom.

In other words, in the case where the contact area is the inner surface of the container, the monomer solution can be discharged with water to the exterior of the container through the discharge port without adhering to nor remaining in the area. In the case where the contact area is the inner surface of the inlet tube, the monomer solution can be discharged with water to the exterior of the inlet tube through the port section (nozzle port, etc.,) without adhering to nor remaining on the area. In the case where the contact area is the outer surface of the inlet tube, the monomer solution can be dropped down under the inlet tube.

The method of supplying water are not particularly limited, and non-limiting examples of which include: 1) a method of spraying water onto the contact area using a spray, etc., 2) a method of supplying water dropwise, 3) a method of supplying water in its flow, 4) a method of supplying water by cooling the inner surface of the container or inlet tube, to form moisture condensation on the inner surface to supply water. Only one of the above methods may be adopted, or two or more methods may be suitably mixed and adopted. Here, it is preferable that a suitable method be selected among the above methods 1) to 4) for the area water is to be supplied. Specifically, for example, in the case of supplying water to the inner surface of the container, or the outer surface of the inlet tube, the method 1) or 2) is preferable, and in the case of supplying water to the inner surface of the inlet tube, the method 3) is more preferable. Water may be supplied continuously or discontinuously to the area.

To the water, additives such as surface active agent, water-soluble salts, or the like, functional material such as polymerization initiator, deodorizer(rant), anti-fungus agent, thickener, chelating agent may be added as necessary. Hydrophilic organic solvent such as various types of alcohol, etc., a water-soluble compound, a hydrophilic monomer (water-soluble ethylenically unsaturated monomer, etc.) may be added to water as necessary. The amount and the kind of the agent(s) to be added to water are not particularly limited, provided the adhesion and remaining of monomer solution can be prevented. The temperature of water is not particularly limited as long as the polymerization of the hydrophilic monomer contained in the monomer solution is not induced but preferably in a range of from 0° C. to 50° C., and more preferably in a range of from 5° C. to 30° C.

According to the process (B) of introducing the hydrophilic monomer, when supplying a solution containing a hydrophilic monomer, water is supplied to at least a part of the area the solution contacts before or at timing the solvent contacts the area. Therefore, unwanted adhering or remaining of the monomer solution, or adhesion or maturation of the polymer of the monomer can be prevented. As a result, for example, 1) the monomer solution can be transported smoothly, and 2) contamination of the polymer adhered to and matured not contaminated in the monomer solution as foreign objects, which would degrade the properties of the resulting water-absorbent polymer can be prevented, and 3) the monomer solution can be used efficiently as a raw material of the water-absorbent polymer.

The above supply method is effective particularly when adopting 1) a container having such shape that the smallest area of the container surrounded by a cross line between the inner surface of the container and a horizontal plane is positioned on the plane including the discharge port, and 2) a container having such shape that the smallest area of the container surrounded by a cross line between the inner surface of the container and a horizontal plane is positioned below a plane including the supply port and above a plane including the discharge port. The particular effects as achieved from the present invention can be appreciated especially when adopting the above containers because the flow of the monomer solution is restricted by the part of the smallest area of the container and the monomer solution is liable to stay in the container for a long time. The above supply method is effective particularly for the continuous polymerization at industrial level.

In the present invention, "continuous polymerization of monomer" indicates to perform a polymerization in a continuous manner with respect to the monomer as a raw material being transported continuously with static or stirring. For example, a static continuous polymerization is performed by means of a belt polymerization device, or the like, and a continuous polymerization with stirring is performed by means of a continuous kneader, or the like. For the continuous transportation of the monomer, it is preferable that at least a part of the transport means such as a transport belt (preferably, an endless belt) or a drum dryer, etc., to be used. In this case, on (the upper surface of) the transport means, the monomer solution is supplied continuously, and for the polymerization reaction, a static polymerization (continuous static polymerization) can be performed on the transport belt. In the case of supplying "monomer" in a form of solution, thickness of the monomer solution to be supplied to the transport means like endless belt is not particularly limited but preferably in a range of from 1 mm to 50 mm, more preferably in a range of from 10 mm to 40 mm, and still more preferably in a range of from 20 mm to 30 mm. A belt for use in a polymerization on a belt, for example, has a width in a range of from 0.1 m to 5 m, preferably in a range of from 0.2 m to 4 m, and a length in a range of from 1 m to 100 m, preferably in a range of from 5 m to 30 m. As long as the solution is fed to the thickness of not less than 1 mm, the water-absorbent polymer can be manufactured at industrial level. Additionally, by feeding the solution to the thickness of not more than 50 mm, heat generated from the polymerization reaction can be removed with ease, and bumping out in the polymerization reaction, an increase in soluble component in the resulting water-absorbent polymer, and the reduction in the gel strength of the water-absorbent polymer can be prevented.

For the polymerization reaction, an initiator of the polymerization reaction (polymerization initiator) may be used as necessary. The kind of the polymerization initiator is not particularly limited, and, for example, a redox initiator of a combination of oxidizing initiator and reducing agent; a heat-decomposable initiator, photopolymerization initiator, etc., may be used. Only one kind of the above-listed polymerization initiators may be adopted, or two or more kinds thereof may be suitably mixed and adopted for the kind of the monomer. The polymerization initiator(s) may be used, for example, in a form of solution, such as an aqueous solution.

Among the above-listed polymerization initiators, photopolymerization initiators and redox initiators are more preferable. Example of photopolymerization initiators include: compounds having a benzoyl group such as 2-hydroxy-2-methyl-1-phenylpropane-1-on, etc., or azo compounds to be described later. An oxidizing initiator contained in the redox initiator is not particularly limited, preferable examples of such oxidizing initiator include: persulfate, hydrogen peroxide, benzoyl peroxide, etc. A reducing agent contained in the redox initiator is not particularly limited, and, for example, L-ascorbic acid (salt), isoascorbic acid (salt), sulfite (including hydrogen salt), thiosulfate, amine, iron (II) ion, Mohr's salt, or the like. Only one kind of the oxidizing initiator (or reducing agent) may be adopted, or two or more kinds thereof may be suitably mixed and adopted. Examples for combinations of the oxidizing initiator and the reducing agent include: a combination of persulfate such as sodium persulfate (NaPs) and L-ascorbic acid (salt), and a combination of persulfate, hydrogen peroxide, and L-ascorbic acid (salt). These combinations are preferable particularly when adopting acrylic acid monomer (hydrophilic monomer) as a raw material.

The amount of use of the oxidizing initiator or the photopolymerization initiator is not particularly limited, but preferably in a range of from 0.0001 g to 1 g based on 1 mole of monomer, and more preferably in a range of from 0.001 g to 0.5 g based on 1 mole of monomer. By setting the amount of use of the oxidizing initiator be not less than 0.0001 g based on 1 mole of the monomer, a polymerization reaction can be initiated without failure, and an amount of the residual unreacted monomer can be reduced. Further, by setting the amount of use of the oxidizing initiator be not more than 1 g with respect to 1 mole of the monomer, such problem of the polymerization reaction proceeding quickly, which makes the removal of the reaction heat (polymerization heat) difficult can be surely prevented. Additionally, an increase in soluble component contained in the resulting water-absorbent polymer, or degrading of various properties of the polymer such as reduction in absorbency can be surely prevented.

The amount of use of the reducing agent is not particularly limited, but is preferably within a range of from 0.0001 mole to 2 mole based on 1 mole of the oxidizing initiator. By setting the amount of use of the reducing agent be not less than 0.0001 mole based on 1 mole of oxidizing initiator, a polymerization reaction can be initiated and completed without failure. Further, by setting the amount of use of the reducing agent be not more than 2 mole with respect to 1 mole of the oxidizing initiator, such problem of the polymerization reaction proceeding quickly, which makes the monomer remain unreacted can be surely prevented.

The redox initiator can be used in combination of the heat-decomposable initiator. In this case, in the state where the monomer solution supplied to the polymerization reaction is at low temperature, the redox initiator is activated, while in the state where the monomer solution is heated as the polymerization reaction proceeds, the heat-decomposable initiator is activated. Therefore, this combination offers a stable polymerization reaction, and thus a water-absorbent polymer which shows high absorbency with small amount of water-soluble component (soluble component) can be obtained. The kind of heat-decomposable initiator is not particularly limited, and examples of which include: azo initiators such as 2,2'-azobis (2-amidinopropane)dihydrochloride; 2,2'-azobisisobutyronitrile; 2,2'-azobis[2-(2-imidazolin-2-yl)propane] dihydrochloride, 2,2'-azobisisobutylamido dihydrate, and the like. Only one kind of the above-listed heat-decomposable ininiators may be adopted, or two or more kinds thereof may be suitably mixed and adopted. The above azo initiators may be used as photopolymerization initiators.

The amount of use of the thermal decomposable initiator is not particularly limited, but preferably in a range of from 0.0001 g to 1 g based on 1 mole of monomer, and more preferably in a range of from 0.001 g to 0.5 g. By setting the amount of use of the thermal decomposable initiator be not less than 0.0001 mole based on 1 mole of monomer, its effect can be fully appreciated. Further, by setting the amount of use of the thermal decomposable initiator be not more than 1 g based on 1 mole of the monomer, such problem of the polymerization reaction proceeding quickly, which makes the removal of reaction heat (polymerization heat) difficult can be surely prevented. Additionally, an increase in soluble component contained in the resulting water-absorbent polymer, or degrading of various properties of the polymer such as reduction in absorbency can be surely prevented.

A combination of the redox initiator and the thermal decomposable initiator is not particularly limited, but is preferably a combination of at least one oxidizing initiator of persulfate or hydrogen peroxide; at least one reducing agent of L-ascorbic acid (salt), isoascorbic acid (salt), sulfite (including hydrogen salt), thiosulfate, or amine; and at least one thermal decomposable initiator of azo initiators including 2,2'-azobis(2-amidinopropane)dihydrochloride. Particularly in the case of adopting acrylic acid monomers as the raw material, a combination of persulfate, hydrogen peroxide, azo initiator, and L-ascorbic acid (salt) is preferable, and a combination of persulfate, hydrogen peroxide, 2,2'-azobis(2-amidinopropane)dihyrochloride (azo initiator), and L-ascorbic acid (salt) is more preferable.

In the case of adopting the redox initiator (including its combined use of other agent(s)), it is preferable that the oxidizing initiator and the reducing agent be supplied at different timings. The redox initiator functions only when being combined with the oxidizing initiator and the reducing agent. Therefore, by supplying in the foregoing manner, a start timing of a polymerization reaction can be controlled as desired. Additionally, in the case of adopting a combination of the redox initiator and the thermal decomposable initiator as a polymerization initiator, it is preferable to carry out i) the first mixing step of mixing the oxidizing initiator and the thermal decomposable initiator with the monomer solution and ii) the second mixing step of mixing the reducing agent with the monomer solution separately, or to carry out i) the first mixing step of mixing the oxidizing initiator with the monomer solution and ii) the second mixing step of mixing the reducing agent and the thermal decomposable initiator with the monomer solution separately. Here, which of the first mixing step and the second mixing sept is to be performed first is not particularly limited.

According to the manufacturing method of a water-absorbent polymer of the present invention, when preparing the water-absorbent polymer by carrying out a polymerization of a hydrophilic monomer in a continuous manner, desirably, it is preferable to include the step detecting temperatures, in a non-contact manner, at a plurality of points different distances away from the point from which the hydrophilic monomer is supplied (step (C). With regard to the above step (C) of detecting reaction temperatures of the polymerization reaction in a non-contact manner from a plurality of points different distances away from the point from which the monomer solution is supplied, explanations will be given for "to detect reaction temperatures of the polymerization reaction in a non-contact manner" and for "to detect reaction temperatures of the polymerization reaction at a plurality of points different distances away from the point from which the monomer solution is supplied" separately.

The first feature "to detect reaction temperatures of the polymerization reaction in a non-contact manner" indicates "to detect the temperatures of the monomer subjected to the polymerization reaction in a non-contact manner, i.e., to detect (also to measure) the temperatures of the monomer subjected to the polymerization reaction indirectly without making a contact with the monomer. The "monomer" subjected to the polymerization reaction indicates the "monomer" in a period from the start till the end of the polymerization reaction, and more specifically indicates a mixture (polymer gel, or in some cases reaction system). Even if the above-defined monomer is subjected to the polymerization reaction, the reaction may not occur due to, for example, temperatures being too low. In this case, "the monomer subjected to the polymerization reaction" indicates "hydrophilic monomer" itself that is a raw material of the water-absorbent polymer.

In the present invention, the reaction temperatures of the polymerization reaction are to be measured in a non-contact manner, mainly because in this way, the reaction temperatures can be measured without interrupting the continuous polymerization of the monomer nor lowing the productivity of the water-absorbent polymer. Namely, in the continuous polymerization, it is industrially difficult to insert the temperature detection means inside the reaction system or making the temperature detection means contact the reaction system. With regard to the polymerization temperature, especially for static polymerization, it has been found that the control method based on the surface temperatures of the gel as measured is more effective over the conventional control method based on the temperatures in the gel as measured for improving respective properties and handling efficiency (viscosity) of the resulting water-absorbent polymer.

For the method of indirectly detecting the reaction temperature of the polymerization reaction, for example, the method of detecting (measuring) the temperature in a vicinity of the monomer or heat releasing amount of the reaction system by placing temperature detection means in a vicinity of the monomer subjected to the polymerization reaction. The indirectly detected temperature of the monomer in the foregoing manner can be converted to the real temperature of the monomer (reaction temperature of the polymerization reaction) with ease, for example, by obtaining beforehand the correlation with the temperature of the monomer to be defected directly, i.e., the temperature (for example, the surface temperature of the monomer) to be detected (measured) by making the thermocouple thermometer contact with the monomer. Examples of temperature detection means include: various types of temperature sensors such as an electrical temperature sensor (platinum wire temperature sensor, etc.), a rock crystal temperature sensor, etc., or a thermometer such as an infrared radiation thermometer, etc.

Among the above-exemplified temperature detection means, desirably those which do not require a separately provided converting circuit such as thermometers are desirably adopted. Among the thermometers, an infrared radiation thermometer for detecting the temperature by sensing the heat radiation (infrared ray) is preferable as it can measure the temperature in a non-contact manner in a shorter time under stable condition as compared to the thermometer utilizing a heat conducting element such as a thermocouple. Here, for the temperature detection means, those which can measure temperatures are preferable, however, in some cases, any temperature detection means which can detect if the temperatures are at or above predetermined temperatures or not (or at or below predetermined temperatures) can be adopted.

The second feature "to detect the reaction temperature at a plurality of points different distances away from the point from which the monomer solution is supplied" specifically indicates to detect the reaction temperatures of the polymerization reaction at a plurality of points different distances away from "the point from which the monomer solution is supplied", i.e., "the monomer supply nozzle (inlet tube) for supplying the monomer in the polymerization zone (corresponding to the polymerization section or the polymerization device). In this way, the reaction temperatures can be detected over time, and the change pattern of the reaction temperatures can be monitored with ease.

In other words, "to detect the reaction temperature at a plurality of points different distances away from the point from which the monomer solution is supplied" indicates in the case of continuously transporting and polymerizing the monomer as a raw material by means of a transport belt, or the like, to detect reaction temperatures at a plurality of points along a transport direction. In still other words, in the case of continuously transporting the monomer supplied to the polymerization reaction at a constant rate to detect respective temperatures of the monomers having different transportation time (i.e., the time period for the polymerization reaction) in the case of continuously transporting the monomer subjected to the polymerization reaction at a constant rate.

The number of the plurality of points for the detection of the reaction temperatures, and intervals between these points are not particularly limited, and those can be suitably selected according to the type of polymerization reaction or the manufacturing device adopted. Among the reaction temperatures, desirably, A) peak temperature (reaction temperature at polymerization peak) and/or in some cases B) reaction temperature(s) in the second half (polymerization reaction after the polymerization peak) are detected preponderantly as these temperatures more affect respective properties and the yield of the final product of the water-absorbent polymers. Therefore, desirably the number of points and intervals between these points are selected so as to enable the detection of at least A), more preferably the detection of both A) and B).

The detections of A) and B) are important for the following reasons. If the peak temperature is too high, various problems occurs such as an increase in a ratio of unwanted secondary reaction, an increase in soluble component in the water-absorbent polymer, a reduction in absorbency under pressure of the water-absorbent polymer, reduction in gel strength of the water-absorbent polymer, an increase in unreacted residual monomer with a temporal consumption of an initiator, or the like. Similarly, if the peak temperature or the reaction temperature(s) in the second half of the polymerization reaction is too low, also various problems occur such as incomplete polymerization reaction which increases the residual monomer in the water-absorbent polymer, reduction in handling efficiency and absorbency of the water-absorbent polymer. These unexpected polymerization reaction may cause degrading of respective properties and the yield of the resulting water-absorbent polymer. The degrading of handling efficiency specifically indicates, for example, an increase in viscosity of the water-absorbent polymer (water-containing gel), for example, which makes the separation of the water-containing gel from the transportation means difficult, or kneading of the water-containing gel when granulating and pulverizing, etc.

The standard for determining if the peak temperature is too high or to low, or if the reaction temperature(s) in the second half of the polymerization reaction is too low can be set as desired according to the type of the polymerization reaction, and respective properties desired for the resulting water-absorbent polymer as a final product. It can be detected if the polymerization reaction is an unexpected one or not based on the peak timing of the polymerization reaction, such as temperature ranges (predetermined ranges) exemplified as control target, or peak timing, etc., in the following explanations on "process of controlling the polymerization reaction".

According to the foregoing method of manufacturing a water-absorbent polymer in accordance with the present invention, the temperatures of the monomer subjected to the polymerization reaction (reaction temperature of the polymerization reaction) are detected in a non-contact manner at plurality of points different distances away from the point from which the monomer solution is supplied, and therefore, the reaction temperatures over time can be detected (measured), and a change pattern of the reaction temperatures can be monitored. As a result, it can be determined if an expected polymerization reaction is being performed in an early stage. Especially, by monitoring a change pattern of reaction temperatures in a vicinity of the peak temperature of the polymerization reaction and/or reaction temperature (s) in the second half of the polymerization reaction, the peak temperature, the timing of the peak of the polymerization reaction (peak timing) and the temperatures in the second half of the polymerization reaction can be seen. As a result, it can be determine if the polymerization reaction being performed is an expected one at an early stage.

For example, in the following cases 1) to 4), expected polymerization reaction would not occur: 1) the actual monomer concentration in an aqueous solution of the monomer (example of monomer solution) is different from the one as expected, or removal of dissolved oxygen is not performed to the expected level: 2) the thickness of the actual aqueous monomer solution fed on the transport belt is different from the thickness as expected, or the initial temperature of the monomer solution is different from the temperature as expected 3) actual cooling temperature or heating temperature for the monomer subjected to the polymerization is not the temperature as expected; and 4) an actual amount of supply of the polymerization initiator of the polymerization reaction is not an expected one. The above-exemplified conditions possibly occur due to problems in dissolved oxygen removing device such as ejector, etc., cooling device, heating device and device for adding polymerization initiator, etc.

Figure 8:
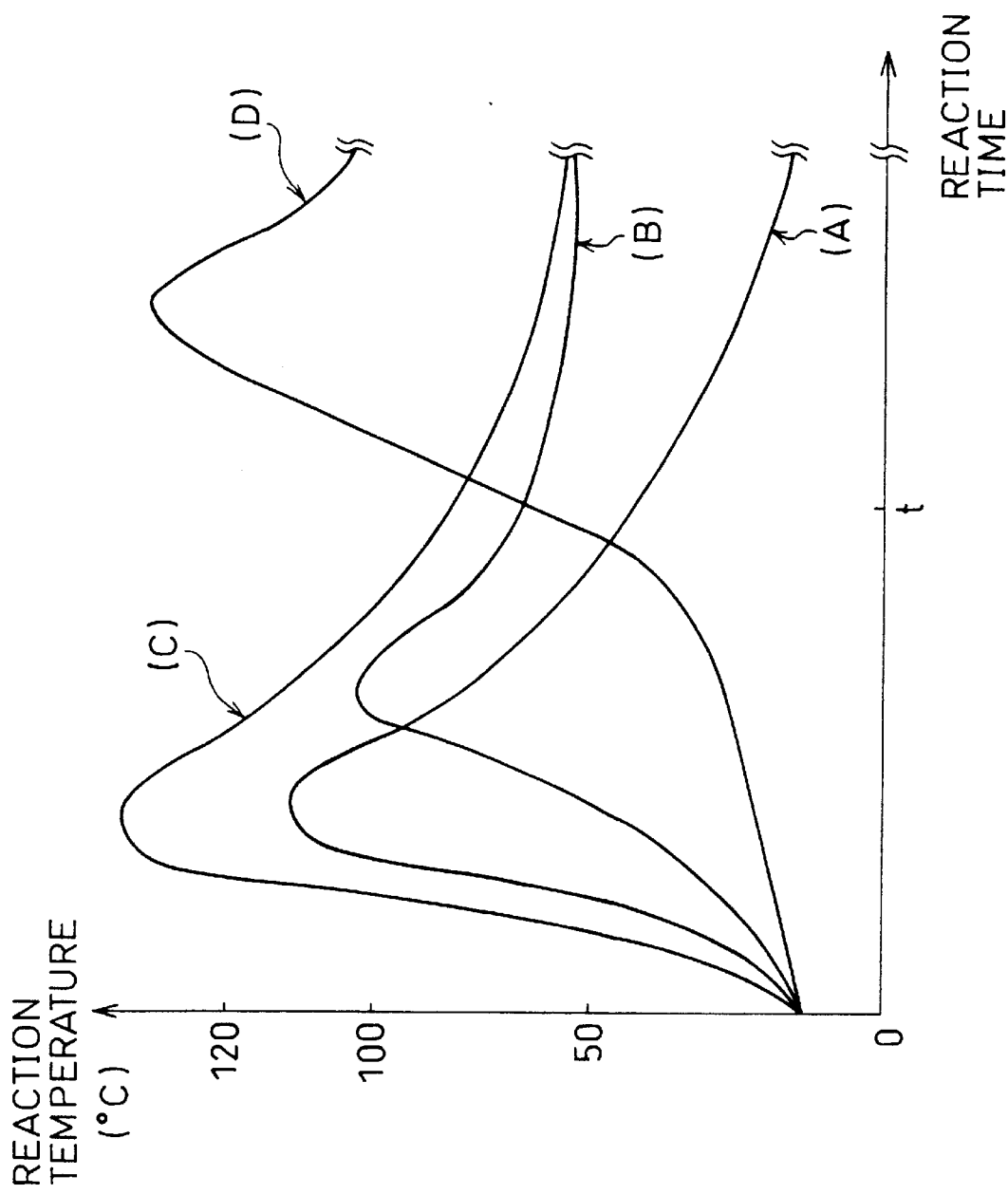
FIG. 8 is a graph showing a change pattern of a reaction temperature of a polymerization reaction when manufacturing a water-absorbent polymer by the conventional method.

Based on the results of detection of the reaction temperatures of the polymerization reaction over time, if it is determined that an expected polymerization reaction is not being performed (see (C) and (D) in FIG. 8), (or expected polymerization will not occur) for example, by immediately terminating the manufacturing line, manufacturing of inferior water-absorbent polymers and consuming of the monomer as a raw material can be suppressed to the minimum. Moreover, by incorporating the below-explained process of controlling the polymerization reaction, the above problem can be managed without terminating the manufacturing line.

Specifically, the method of manufacturing a water-absorbent polymer in accordance with the present invention may include the process of controlling the polymerization reaction based on the results of above detection, for example, so that the peak temperature of the polymerization reaction and the reaction temperature(s) in the second half of the polymerization reaction fall within predetermined ranges respectively.

The peak temperature, and the reaction temperature(a) in the second half of polymerization reaction which offer desirable properties and yield of the water-absorbent polymer differ depending on the type of polymerization reaction and the properties as desired for the resulting water-absorbent polymer as a final product. However, generally, the peak temperature is preferably in a range of from 60° C. to 120° C., more preferably in a range of from 70° C. to 105° C., and still more preferably in a range of from 80° C. to 100° C. Generally, the reaction temperature(s) in the second half of the polymerization reaction, especially the temperatures after the completion of the polymerization reaction are preferably not less than 50° C., more preferably not less than 60° C. to not more than the peak temperature, and still more preferably in a range of from 60° C. to 95° C., and most preferably in a range of from 60° C. to 90° C. The above exemplified "predetermined range" indicates a reaction temperature of the polymerization reaction measured as the surface temperature of the monomer being supplied to the polymerization reaction, and by controlling the reaction temperature to be the target temperature, desirable properties of the water-absorbent polymer and the productivity of the resulting water-absorbent polymer as a final product can be achieved.

In some cases, the above polymerization reaction is performed under cooling for a predetermined period (hereinafter referred to as the first polymerization reaction). In this case, the polymerization reaction may be controlled based on the results of detection of the temperatures of the polymerization reaction in non-contact manner such that the peak of the polymerization reaction falls in the predetermined period for cooling. In this way, the polymerization peak appears in a part of the polymerization reaction to be performed under cooling, and an excessive rise in reaction temperature of the polymerization reaction can be suppressed. The above cooling treatment may be applied throughout the polymerization reaction, or only in the first half of the polymerization reaction.

The above polymerization reaction may be performed under cooling for a predetermined period (first polymerization reaction), and subsequently under heating for a predetermined period (hereinafter referred to as a second polymerization reaction). In this case, the polymerization reaction may be controlled such that the peak of the polymerization reaction falls in the predetermined period of the first polymerization reaction based on the results of detection of the temperatures of the polymerization reaction in a non-contact manner. In this way, in addition to the effect of suppressing an excessive rise in the reaction temperature of the polymerization reaction, the reduction in the reaction temperature over time in the second half of the polymerization reaction can be surely prevented. Between the described first polymerization reaction and the second polymerization reaction or after the described first polymerization reaction, there may be a period in which a polymerization reaction is performed without cooling treatment nor heating treatment. The above cooling condition and heating condition indicate conditions under which the reaction system can be cooled or heated. The second half of the polymerization reaction may be performed by polymerizing the gel without under heating nor cooling.

When controlling the polymerization reaction so that the peak of the polymerization reaction falls in the first polymerization reaction, if the peak timing is too much deviated to the beginning or the end of the first polymerization reaction, the following problem may arise. That is, if the peak is too much deviated to the beginning of the first polymerization reaction, an excessive reduction in the reaction temperature of the polymerization reaction may occur before the completion of the reaction, resulting in an increase in residual monomer or a soluble component. In the case of detecting the reaction temperatures of the polymerization reaction by the surface temperature of the monomer subjected to the polymerization reaction, if the peak timing is too much deviated to the end of the first polymerization reaction, the peak timing of the polymerization reaction of the monomer inside may appear after the first polymerization reaction, resulting in the problems of bursting of water-containing gel, increase in an amount of residual monomer and soluble component, etc. In these cases, the polymerization reaction may be controlled by the method of adjusting cooling condition, an amount of use of the polymerization initiator, an amount of oxygen dissolved in the aqueous monomer solution, etc.

As described, according to the method of manufacturing a water-absorbent polymer including the step (c), the polymerization reaction is controlled, for example, such that the peak temperature of the polymerization reaction and the reaction temperatures in the second half of the polymerization reaction fall within a predetermined range based on the reaction temperatures of the polymerization reaction as detected in a non-contact manner. Further, the polymerization reaction is controlled such that, for example, the peak of the polymerization reaction appears in the first polymerization reaction. Namely, even if it is determined that the expected polymerization reaction does not occur (there is a possibility that the expected polymerization reaction will not occur), the recovery to the expected polymerization reaction can be achieved without terminating the manufacturing line.

For the process of controlling the polymerization reaction, for example, the method of adjusting an amount of the monomer supplied and/or the method of adjusting the temperature of the monomer may be adopted.

The resulting water-containing gel of the water-absorbent polymer from the polymerization of hydrophilic monomer is subsequently transported by the transportation means. Desirably, this process of transporting the water-containing gel in or after the polymerization reaction includes the step (D) of supplying water to the water-containing gel and/or the transport means.

More specifically, for example, when transporting the water-containing gel while being supported by a support face of the transportation means, it is more preferable to include the process of supplying water 1) in a spacing between the support face for supporting the water-containing gel and/or 2) in region of the water-containing gel in a vicinity of the area supported by the support face.

For the transport means, any transport means provided with a support face which contacts and supports the water-containing gel may be adopted. The transport means can be roughly classified into two types: a) transport means of relative position fixed type for transporting the water-containing gel while maintaining the relative position between the support face and the water-containing gel constant; and b) transport means of relative position variable type for transporting the water-containing gel while moving the water-containing gel relative to the support face of the transport means. Examples of a) transport means include transport belt (belt conveyer) such as endless belt, etc. Examples of b) transport means include a guide rolls which are freely rotatable without requiring drive force; rotation rolls (drive rollers) for rotation with an applied drive force; a roller conveyer composed of a plurality of rotation rolls or guide rolls, etc. The particular effects as achieved from the method of the present invention can be more appreciated when adopting the transport means of the type b). Here, axially supported rotatable members such as guide rolls, rotation rolls, etc., are hereinafter simply referred to as rolls. The examples of the above support surface include: a belt surface, a roller surface, etc., which supports the water-containing gel from underneath; inner surfaces of side walls formed on both sides of the transport belt provided in the widthwise direction or collars formed on both sides of the roll, etc. The support face of the present invention is not particularly limited, and any of those having a plane shape structure in contact with the water-containing gel, etc., may be adopted.

The "water" is supplied into a) a spacing between the support face for supporting the water-containing gel and the water-containing gel and/or b) at least a part of an area of the water-containing gel (preferably entire area) in a vicinity of the area supported by the support face. As a result, a) the water-containing gel swells, and further b) in the case of I) above, a water layer is formed in the spacing between the support face and the water-containing gel, thereby preventing an adhesion of water-containing gel onto the support face. Moreover, the water-containing gel once adhered to the support face can be released therefrom. The timing of supplying water is not particularly limited, and the water can be supplied at a predetermined timing before the water-containing gel contacts the support face or while the water-containing gel is in contact with the support face. However, in the case of supplying water in the spacing between the support surface and the water-containing gel, it is desirable that the water be applied to the support face beforehand, and the water-containing gel is placed thereon.

The method of supplying water to the support face or the water-containing gel are not particularly limited, and non-limiting examples of which include: 1) a method of spraying water using a spray, etc., 2) a method of supplying water dropwise, 3) a method of supplying water to the support face in a form of condensation by cooling the support face. More specifically, the method 3) indicates to form condensation of water (generally steam water) by cooling the temperature of the support face at or below the dew point either by a) cooling the support face directly or b) introducing cold air or cold water in the back surface (inner surface) of the support face. Only one kind of the above-listed methods 1) to 3) may be adopted, or two or more methods may be suitably combined and adopted. The water may be supplied both in a continuous manner or a batch manner.

The method of supplying water in its flow is not excluded. However, when an excessive amount of water is supplied in this manner, a burden for post-processing (granulating, pulverizing, drying, etc.) would be increased. Therefore, in some cases, a supply amount of water needs to be set in consideration of the subsequent process to be applied.

To the water, additives such as surface active agent, water-soluble salts, or the like, functional material such as polymerization initiator, deodorizer(rant), anti-fungus agent, thickener, chelating agent may be added as necessary. Hydrophilic organic solvent such as various types of alcohol, water-soluble compound, hydrophilic monomer (water-soluble ethylenically unsaturated monomer, etc.) may be added to water as necessary. Among these aqueous solutions, 100 percent water, or water content of not less than 99 percent by weight are preferable. The temperature of water is not particularly limited, but preferably in a range of from 0° C. to 80° C., more preferably in a range from 5° C. to 50° C.

According to the water-containing gel transport method of the present invention, adhesion of water-containing gel onto the support face can be prevented. Moreover, the water-containing gel adhered to the support face can be released therefrom. As a result, the water-containing gel can be prevented from being entrapped, clogged, buckled, rolled in, etc., in the transport means which hinders the smooth transportation of the water-containing gel can be prevented. As a result, such problem that the water-containing gel is cracked or cut as being extended can be prevented form being extended.

More specifically, in the case of adopting the transport means of relative position varying type, such as guide rolls, rotation rolls, roller conveyer, or the like, the water-containing gel can be prevented from being adhered onto the support face of the transport means. Therefore, for example, such effect that a smooth relative movement (transportation) of the water-containing gel with respect to the support surface can be achieved without the problem of being entrained into a spacing between rolls. In the case of adopting the transport means of constant relative position type, the water-containing gel can be prevented from adhering onto the support face of the transport means. As a result, the water-containing gel can be separated from the support face with ease, and the water-containing gel can be smoothly conveyed to the exterior of the transport means to guide rolls, rotation rolls, roller conveyer, etc.

Especially, in the case of performing a static polymerization of the hydrophilic monomer, the polymerization may be delayed partially, particularly on the surface portion (incompletely polymerized portion may occur). In this case, the adhesiveness of the incompletely polymerized portion on the surface may be particularly high as compared to the other portion of the resulting water-containing gel, which causes the adhesion of the plate-like water-containing gel as discharged from the belt polymerization device onto the support face and hinders a smooth transportation of the water-containing gel. However, according to the water-containing gel transport method of the present invention, generation of factors which hinder smooth transportation can be prevented/suppressed.

In the case of performing the polymerization and subsequent process of the monomer in a continuous manner, if adhesion of the water-containing gel onto the support face occurs, it may be necessary to terminate the operation of the entire manufacturing device. The foregoing transport method in accordance with the step (D) is effective for the solution of the above problem.

As described, the method of manufacturing the water-absorbent polymer in accordance with the present invention in a continuous manner includes at least one of the above-explained steps (A) to (D). The step (B) may include the step of introducing an aqueous solution including a hydrophilic monomer such as a water-soluble ethylenically unsaturated monomer, etc., and subsequently washing out the solution with water. By incorporating this step into the step (B), such effects that generation of the polymer and the retention thereof can be prevented in the monomer solution contact areas such as various tubes (corresponding to the monomer supply path 17 in FIG. 1), ejector, aspirator, a mixer for mixing the monomer solution with the polymerization initiator, introduction tube (monomer supply nozzle), etc., and the water-absorbent polymer can be prepared in a stable manner at an industrial level.

The above-explained step (B) may further includes the step of supplying an aqueous solution including hydrophilic monomer such as aqueous solution of ethylenically unsaturated monomer in a hollow member provided with a supply port from which the solution is supplied and an discharge port from which the solution is discharged, and the step of supplying water to at least a part of the area of the inner surface of the hollow member, which the solution containing the hydrophilic monomer contacts at or before the timing of performing the above step of supplying the solution.

The above method of supplying the hydrophilic monomer in the step (B) may be adopted, for example, in the case of supplying the solution containing a hydrophilic monomer into a hollow member having such shape that the smallest area of the hollow member, surrounded by a cross line between the inner surface of the hollow member and a horizontal plane is positioned on the plane including the discharge port.

The above method of supplying the hydrophilic monomer in the step (B) may be also adopted, for example, in the case of supplying the solution containing a hydrophilic monomer into a hollow member having such shape that the smallest area of the hollow member surrounded by a cross line between the inner surface of the hollow member and a horizontal plane is positioned below a plane including the supply port and above a plane including the discharge port.

The above step (C) may be a part of the process of preparing the hydrophilic monomer by performing a static polymerization in a continuous manner which is a step of measuring the surface temperature of the reaction system as the reaction temperature of the polymerization reaction at plurality of points different distances away from the point from which the hydrophilic monomer solution is supplied. The surface temperature of the reaction system may be measured by means of thermal infrared radiation thermometer in a non-contact manner.

It may be arranged so as to detect the polymerization peak temperature and the peak timing by measuring the reaction temperatures of the polymerization reaction at a plurality of points, and to manufacture a water-absorbent polymer continuously while controlling the polymerization reaction based on the results of detection. Moreover, it is preferable that the hydrophilic monomer (monomer solution) which is an object to be measured be supplied to the belt polymerization device being driven which is provided with the means for cooling and/or heating the belt surface.

The method of transporting the water-containing gel of the above step (D) may be arranged so as to supply water to said water-containing gel and/or the transport means when transporting the water-containing gel by the transport means.

According to the above method, a smooth transportation of the water-containing gel can be realized without being entrapped by the transport means, or being cut.

The method of transporting the water-containing gel of the above step (D) may be performed by supplying water to the water-containing gel and/or to rolls provided in the transport means when transporting the water-containing gel while being supported by the rolls.

For a desirable transportation of the water-containing gel, the water-containing gel being transported is maintained generally at temperatures of not less than 40° C., preferably in a range of from 50° C. to 100° C., and more preferably in a range of from 60° C. to 90° C. If the temperature of the water-containing gel is too low, it would be difficult to transport it. On the other hand, if the temperature of the water-containing gel is too high, the gel would possibly deteriorate. Although the water-containing gel can be transported after being granulated, in consideration of transporting efficiency, the water-containing gel is to be transported as being ejected to the exterior of the belt polymerizing device, i.e., in a form of a plate.

According to the above method, a smooth transportation of the water-containing gel can be realized without being entrapped by the transport means, or being cut.

Furthermore, the water-containing gel may be transported while supporting the water-containing gel by a plurality of rolls provided in the transport means irrespectively of whether or not water is to be supplied. This method offers such effect that the water-containing gel can be transported by a simple means of a plurality of rolls without requiring drive force from the drive source. It should be noted here that the rolls which require drive force may be adopted as well.

The above step (D) may be performed while heating the water-containing gel being transported by the transport means. According to this method, the water-containing gel can be matured while being transported, and thus an amount of residual monomer component contained in the water-containing gel can be reduced.

Furthermore, the process of transporting the water-containing gel of step (D) may include the step of supplying aqueous solution in a spacing between the support face for supporting the water-containing gel and the water-containing gel when transporting the water-containing gel obtained by polymerizing hydrophilic monomer such as water-soluble ethylenically unsaturated monomer while being supported by the support face of the transport means.

The process of transporting the water-containing gel of step (D) may also be arranged so as to include the step of supplying water in a spacing between the support face for supporting the water-containing gel and the water-containing gel and the step of separating the water-containing gel from the support face and transporting it to the exterior of the transport means.

The process of transporting the water-containing gel of step (D) may also be arranged so as to include the step of supplying water to a region in a vicinity of an area supported by the support face when transporting the water-containing gel while being supported by the support face of the transport means and the step of separating the water-containing gel from the support face and transporting it to the exterior of the transport means.

The process of transporting the water-containing gel of step (D) may further be arranged such that the water-containing gel is transported while relatively moving it with respect to the support face of the transport means in a state the water-containing gel is supported by the support face, and water is supplied in a spacing between the support face which supports the water-containing gel and the water-containing gel.

The process of transporting the water-containing gel of step (D) may further be arranged such that the water-containing gel is transported while relatively moving it with respect to the support face of the transport means in a state the water-containing gel is supported by the support face, and water is supplied to around a part of the water-containing gel supported by the support face.

The process of transporting the water-containing gel of the step (D) may further be arranged such that a water-containing gel obtained by performing a static polymerization of hydrophilic monomer (water-soluble ethylenically unsaturated monomer, etc.) on an endless belt while supporting the gel by the support face, and the process includes the step of supplying water in a spacing between the back end portion (end part) of the support in the water-containing gel transport direction and the water-containing gel, and the step of separating the water-containing gel from the end part and transporting it to the exterior of the endless belt.

The process of transporting the water-containing gel of the step (D) may further be arranged such that a water-containing gel obtained by performing a static polymerization of hydrophilic monomer (water-soluble ethylenically unsaturated monomer, etc.) on an endless belt while supporting the gel by the support face, and the process includes the step of supplying water in a part of the water-containing gel at the back end portion in the water-containing gel transport direction and the step of separating the water-containing gel from the endless belt and transporting it to the exterior of the endless belt.

The water-containing gel resulting from the forgoing polymerization reaction is subjected to the drying process, and to each this drying process, the water-containing gel is ground to be granular water-containing gel (granular gel) having an average particle diameter in a range of from 1 mm to 10 mm. For the grinding of the gel, any device may be adopted, provided that it can granule the water-containing gel in a form of a block or sheet into granules of predetermined size. Examples of such device include: a meat chopper (available from Hiraga Kosakusho Co., Ltd.), kneader, crusher (cutter mill, shred crusher, etc.), slitter with cutter knife, etc.

To dry the granulated gel, generally used dryer or furnace may be adopted, non-limiting examples of which include: a thin agitated dryer, a rotary dryer, a disc dryer, a fluidized bed dryer, a flash dryer, an infrared dryer, etc. Generally, the drying temperature for this drying treatment is preferably in a range of from 40° C. to 250° C., more preferably in a range of from 90° C. to 200° C., and still more preferably in a range of from 120° C. to 180° C. The drying time is preferably in a range of from 1 to 180 minutes, and more preferably in a range of from 10 to 120 minutes. The resulting dried product from the above drying process contains solid components (obtained, for example, under conditions of 180° C. for 3 hours) generally in a range of from 70 percent by weight to 100 percent by weight, more preferably in a range of from 80 percent by weight to 98 percent by weight, and still more preferably in a range of from 90 percent by weight to 97 percent by weight.

The resulting dried product may be used as water-absorbent resin without further treatment. However, it may be subjected to further treatment such as grinding, classifying into water-absorbent polymer particles of a predetermined size. In this case, the particle size is generally in a range of from 10 $\mu$m to 5 mm, and more preferably in a range of from 100 $\mu$m to 1 mm. The average particle diameter differs depending on the intended use of the polymer particles, but generally in a range of from 100 $\mu$m to 1000 $\mu$m, more preferably in a range of from 150 $\mu$m to 800 $\mu$m, and still more preferably in a range of from 200 $\mu$m to 700 $\mu$m. The content of fine powders of not more than 150 $\mu$m is preferably not more than 10 percent by weight, and more preferably not more than 5 percent by weight.

The water-absorbent polymer particles may be subjected to further treatment so as to crosslink a portion around the surface thereof. In this way, water-absorbent polymer having a high absorbency under load can be obtained. For this surface crosslinking treatment, crosslinking agents reactive to a functional group, such as a carboxyl group of the water-absorbent polymer may be adopted, and examples of known crosslinking agent used for that purpose are as below-listed.

Examples of such surface crosslinking agents include: polyvalent alcohols such as ethylene glycol, 1,4-butanediol, 1,6-hexanediol, propylene glycol, glycerol, etc.; alkylene carbonate compounds, such as ethylene carbonate and propylene carbonate; polyvalent epoxy compounds, such as (poly)ethylene glycol diglycidyl ether; polyvalent amine compounds, such as ethylene diamine and polyethylene imine; polyvalent metal compounds, such as aluminum sulfate, aluminum (poly)chloride; etc.

An amount of use of the surface crosslinking agent is preferably in a range of 0.01 to 10 parts by weight based on 100 parts by weight of water-absorbent polymer, and more preferably in a range of from 0.5 to 5 parts by weight. For the heating treatment for reacting the water-absorbent polymer with the surface crosslinking agent, generally used dryer or furnace may be adopted, non-limiting examples of which include: a thin agitated dryer, a rotary dryer, a disc dryer, a fluidized bed dryer, a flash dryer, an infrared dryer, etc. The drying temperature for this drying treatment is preferably in a range of from 40° C. to 260° C., more preferably in a range of from 100° C. to 240° C., and still more preferably in a range of from 150° C. to 220° C. The drying time is preferably in a range of from 1 to 180 minutes, and more preferably in a range of from 10 to 60 minutes. The resulting dried product from the above drying treatment contains solid component generally in a range of from 10 weight to 60 percent by weight.

To the resulting water-absorbent polymer of the present invention, a deodorant, perfume, various inorganic powders, foaming agents, pigments, dyes, hydrophilic short fibers, plasticizer, adhesive, surface-active agents, fertilizers, oxidizing agents, reducing agents, chelating agents, water, salts, etc. may be added to provide additional functions to the water-absorbent polymer.

The resulting water-absorbent polymers from the foregoing method show excellent properties under stable conditions, and the foregoing method permits such water-absorbent polymers to be manufactured in a continuous manner. Therefore, the water-absorbent polymers resulting from the foregoing method are suitably adopted for sanitary materials such as paper diapers, sanitary napkins, etc.

Water-absorbent Polymer Manufacturing Device 1

An example of devices which permit a water-absorbent polymer including at least one of the steps A to D to be manufactured in a continuous manner is shown in FIG. 1.

This device is provided with means for executing the step (A). Specifically, the manufacturing device shown in FIG. 1 includes the gas supply means for continuously supplying inert gas with respect to the solution containing a hydrophilic monomer and a polymerization section for continuously polymerizing the hydrophilic monomer, and includes gas removing means for removing the inert gas supplied to the solution. Namely, the described manufacturing device permits the water-absorbent polymer to be manufactured continuously with a reduced amount of (or without) residual bubbles as compared to those produced by the conventional device by removing inert gas contained in the aqueous solution by the gas removing means. This device is provided with means for executing the step (C). Specifically, the manufacturing device of the water-absorbent polymer, which has a polymerization zone for continuously polymerizing a monomer (hydrophilic monomer) subjected to the polymerization reaction, wherein temperature detection means for detecting temperatures of monomers supplied to the polymerization reaction at a plurality of points different distances away from which the monomer solution is supplied in a non-contact manner. In other words, the manufacturing device permit the reaction temperature of the polymerization reaction to be detected in a non-contact manner at plurality of points different distances away from the point from which the monomer solution is supplied.

As shown in FIG. 1, the above manufacturing device includes a monomer tank 11 for storing a monomer as a raw material of the water-absorbent polymer, an ejector (gas supply means) 12 for supplying inert gas, an initiator tank 13 for storing the oxidizing initiator, the reducing agent tank 14 for storing the reducing agent, a mixing column 15 (serving also as cyclone room (gas removing means)), and a transport belt (transport means) 16 for continuously transporting in a transport direction the monomer supplied within the polymerization device 18 throughout a port of a nozzle 15a provided in the mixing column 15, and further includes a plurality of infrared radiation thermometers $T_1$ to $T_6$ serving as a plurality of temperature detection means 27 on the upper wall of the polymerization device 18. In the manufacturing device shown in FIG. 1, the polymerization zone indicates an entire zone the polymerization reaction takes place, more specifically indicates the polymerization device 18. The mixing column 15 functions also as the monomer introducing nozzle (inlet tube) for placing the monomer in the polymerization device 18.

In the monomer tank 11, the monomer is stored, for example, in a form of an aqueous solution (hereinafter referred to as an aqueous solution), and after having dissolved oxygen removed by inert gas supplied from the ejector 12, the aqueous monomer solution is introduced in the mixing column 15 via the monomer supplying path 17.

The kind of inert gas for use in removing the oxygen dissolved in the aqueous monomer solution is not particularly limited, but, preferable examples of the inert gas include such as nitrogen gas, argon gas, helium glas, etc. The method of removing oxygen dissolved in the aqueous monomer solution is not particularly limited, and for example, a method of introducing inert gas by means of aspirator in replace of the ejector 12, or the method of deaerating under reduced pressure may be adopted. Also, these methods can be respectively combined with known methods of removing oxygen dissolved therein. Furthermore, such removal of the oxygen dissolved in the monomer can be performed in the monomer tank 11.

As shown in FIG. 2, the mixing column 15 includes the first mixing section (serving also as cyclone room wherein the aqueous monomer solution flows in the Cyclone room along a spiral line 15b, and 2) the second mixing section following the first mixing section. The first mixing section is, for example, a combination of a cylinder shaped inner surface and a truncated cone shaped inner surface, and has a reducing cross section towards the bottom. The second mixing section, for example, has a cappillar shape of a constant cross section.

In the first mixing section, the aqueous monomer solution supplied through the monomer supply path 17 flows along the line 15b, and a circulating flow of the aqueous monomer solution is generated. As a result, inert gas bubbles can be removed (deaerated) from the aqueous monomer solution. Further, along with the described inert gas removal operation, the monomer solution is mixed with oxidizing initiator such as NaPs, etc., supplied via the initiator supply path 13a.

The aqueous monomer solution, after removing therefrom inert gas and mixing therewith oxidizing initiator, etc., is subsequently introduced in the second mixing section. In the second mixing section, a reducing agent such as, for example, L-ascorbic acid (L-A), etc., is supplied and line mixed with the aqueous monomer solution through the reducing agent supplying path 14a. As a result, the monomer, the oxidizing initiator, and the reducing agent are mixed. Here, the polymerization reaction is initiated within the polymerization zone.

In the case of adopting a redox initiator including the above-explained oxidizing initiator and the reducing agent, it may be arranged such that the supplying and mixing of the reducing agent is performed in the first mixing section, and supplying and line mixing of the oxidizing initiator is performed in the second mixing section. The redox initiator functions only when being combined with the oxidization initiator and the reducing agent. Therefore, by arranging such that either one of the oxidization initiator and the reducing agent is mixed in the cyclone room (first mixing section), and the other is mixed in a spacing (second mixing section) between the cyclone room and the polymerization device 18, a start timing of the polymerization reaction can be adjusted as desired.

In the case of adopting a polymerization initiator of, for example, i) a redox initiator in combination of persulfate, hydrogen peroxide, and L-ascorbic acid, and ii) an azo initiator as a thermo-decomposable initiator (for example, V-50; trade mark of WAKO PURE CHEMICAL INDUSTRIES, LTD.), it is more preferable to arrange such that the oxidizing initiator (persulfate, hydrogen peroxide) and the thermal decomposable initiator (azo initiator) are mixed with the aqueous monomer solution in the first mixing section, and the reducing agent (L-ascorbic acid) is mixed with the aqueous monomer solution in, the second mixing section. By mixing these four components with the aqueous monomer solution, such problem that the polymerization reaction is initiated in the first mixing section serving as cyclone room can be eliminated.

In other words, in the case of mixing the redox initiator and the thermo-decomposable initiator with the aqueous monomer solution in a continuous manner, it is more preferable to arrange such that the oxidizing initiator and the thermo-decomposable initiator are mixed with the aqueous monomer solution within the first mixing section, and subsequently the reducing agent is mixed therewith in a spacing (second mixing section) between the first mixing section and the polymerization device 18. The oxidizing initiator, the reducing agent, and the thermo-decomposable initiator can be line mixed with the aqueous monomer solution respectively. In this case also, it is preferable that the reducing agent be mixed at last (more preferably at timing directly before reaching the polymerization device 18). Especially, in the case of adopting persulfate (oxidization initiator), hydrogen peroxide (oxidization initiator), L-ascorbic acid (salt) (reducing agent), and 2,2'-azobis(2-amidinopropane) dihydrochloride(azo initiator), by adopting the above mixing method, the water-absorbent polymer can be manufactured with ease in a continuous manner at an industrial level.

The temperature of the aqueous monomer solution is not particularly limited, but preferably in a range of from 10° C. to 40° C. directly before the polymerization reaction starts, more preferably in a range of from 15° C. to 25° C., and still more preferably in a range of from 15° C. to 20° C. As long as the temperature of the aqueous solution of the monomer is not less than 10° C., a polymerization reaction is surely initiated and the induction period till the start of the polymerization reaction would not be too long. Moreover, when the temperature is not more than 40° C., heat generated by the polymerization reaction can be removed with ease, and a bumping in the polymerization reaction, an increase in soluble component (soluble polymer) contained in the resulting water-absorbent polymers, and a reduction in gel strength of the water-absorbent polymer can be prevented. Additionally, such problem that the polymerization reaction proceeds abruptly can be prevented, which surely prevents such problem that the oxidizing initiator and the reducing agent are consumed at one time, and a large amount of monomers remain unreacted as residual monomers.

The aqueous monomer solution introduced in the mixing column 15 serving also as a monomer supply nozzle is subsequently supplied on the upper surface of the transport belt 16 provided in the polymerization device 18 via the nozzle port 15a. The nozzle port 15a at one end of the mixing column 15 is bent in a transport direction of the aqueous monomer solution by the transport belt 16. The purpose of this bent structure is to 1) smoothly supply the aqueous monomer solution onto the upper surface of the transport belt 16, and to 2) supply a constant amount of the aqueous monomer solution onto the upper surface of the transport belt 16. However, the transport belt of the present invention is not particularly limited to this bent structure. An amount of supply (feed amount: corresponding to a solution thickness in the case of a constant width of the nozzle port 15a) of the aqueous monomer solution to be fed the upper surface of the transport belt 16 is not particularly limited.

The transport belt 16 is a belt conveyer which is supported and driven by drive axes 20 which rotate at constant transport rate in the same direction. The transport belt 16 is covered with a hood 41 provided thereabove, and is replaced with nitrogen. Additionally, a predetermined region on the front side in the transport direction (cooling zone 18a) of the upper surface of the transport belt 16 is cooled off, while a predetermined region on the back side in the transport direction (heating zone 18b) is heated. Here, "heating" and "cooling" are determined based on the temperature of the reaction system.

The method of cooling/heating the upper surface of the transport belt 16 is not particularly limited, and, for example, the method of cooling/heating the upper surface from the back surface side by means of cooling/heating devices, or the method of cooling/heating the upper surface from the back surface by means of cool water shower/hot water shower may be adopted. When adopting the method of cooling the upper surface from the back side by the cool water shower, the temperature of cool water is not particularly limited, but preferably in a range of from 0° C. to 30° C. When adopting the method of heating the upper surface from the back side by means of hot water shower, or a heater, the temperature after the heat treatment is not particularly limited, but preferably not less than 50° C. and still more preferably less than 60° C.

The monomer supplied (added) on the upper surface of the transport belt 16 via the nozzle port 15a is subjected to a static polymerization on the upper surface to be performed in a continuous manner. The polymerization reaction on the upper surface of the transport belt 16 is performed in the cooling zone 18a under cooling for a predetermined time (first polymerization reaction) and is performed in the heating zone 18b under heating for a predetermined time (second polymerization reaction). As a result, the aqueous monomer solution subjected to the polymerization reaction is transported in the polymerization device 18 by the transport belt 16, and a polymerization is performed at first while suppressing an excessive rise in reaction temperature. Subsequently, the polymerization and maturing process be performed while suppressing an excessive reduction in the reaction temperature, thereby producing a water-containing gel (one type of water-absorbent polymer) 19.

The above polymerization reaction, i.e., the first polymerization reaction and the second polymerization reaction are performed while measuring the temperatures by means of a plurality of infrared radiation thermometers $T_1$ to $T_6$ provided on the upper wall of the polymerization device 18, and in this way, the reaction temperature can be measured in non-contact manner. As shown in FIG. 1, infrared radiation thermometers $T_1$ to $T_6$ are provided for measuring the reaction temperatures at plurality of points different distances away along the transport direction of the monomer. As a result, the reaction temperatures can be measured over time, and the change pattern can be monitored with ease.

In the manufacturing device, it is preferable to detect the surface temperature of the reaction system (temperature of the surface on the side away from the back surface of the transport belt 16) as the reaction temperature of the polymerization reaction, for the below-explained reason. That is, in the case where the manufacturing device has the cooling zone 18a and the heating zone 18b, the reaction system shows a temperature distribution in its thickness direction. Specifically, for the polymerization reaction in the cooling zone 18a, removal of heat is sufficiently performed in a portion in a vicinity of the transport belt 16 of the reaction system, and thus the reaction temperature (hereinafter referred to as inside temperature) is lowered as compared to the surface temperature of the reaction system. Therefore, in the case of detecting the inside temperature as the reaction temperature of the polymerization reaction, when transporting the reaction system to the heating zone 18b, for example, the surface temperature may go outside the predetermined range without notice.

Among the reaction temperatures, desirably, A) the peak temperature and B) the reaction temperature (a) in the second half of the polymerization reaction be detected preponderantly as these temperatures affect various properties and the yield of the final product of the water-absorbent polymers. According to the manufacturing device of the present embodiment, since the heating zone 18b, under normal conditions, the reaction temperature in the second half of the polymerization reaction would not be below the predetermined temperature, and thus the measurement of the temperature B) can be omitted. However, a damage on a heater, etc., provided in the heating zone 18b may possibly occur. In view of the foregoing, preferably, infrared radiation thermometers $T_1$ to $T_6$ be provided so as to permit the measurement of at least A) and more preferably the measurements of both A) and B). In some cases, the temperature detection means 27 may be provided in the mixing column 15. The number of the infrared radiation thermometers and installation intervals thereof are not particularly limited.

According to the manufacturing device of the water-absorbent polymer shown in FIG. 1, by means of infrared radiation thermometers $T_1$ to $T_6$, the temperature of the monomer subjected to the polymerization reaction (reaction temperature of the polymerization reaction) is detected (measured) in non-contact manner at plurality of points different distances away from point from which the monomer solution is supplied. Therefore, by measuring the reaction temperatures over time, and monitoring change pattern, whether or not expected polymerization reaction is being performed can be determined in an early stage. Particularly, by monitoring temperatures around peak temperature and changes in pattern of the reaction temperature(s) in the second half of the polymerization reaction whether or not expected polymerization is being performed can be determined in an early stage.

As a result of measurement of the reaction temperature of the polymerization reaction over time, if it is determined that an expected polymerization reaction is not being performed, (or expected polymerization will not take place), for example, by immediately terminating the manufacturing line, manufacturing of inferior water-absorbent polymers and consuming of the monomer as a raw material can be suppressed to the minimum. Moreover, by incorporating the below-explained process of controlling the polymerization reaction, the above problem can be managed without terminating the manufacturing line.

When it is determined that an expected polymerization reaction is not being performed (or expected polymerization will not take place), the polymerization reaction is controlled, for example, in the following manner. That is, based on the results of measurement of the reaction temperature in a non-contact manner, the polymerization reaction is controlled, for example, such that a) peak temperature of the polymerization reaction falls in the predetermined range, b) the reaction temperature(s) in the second half of the polymerization reaction falls in a predetermined range, and c) a peak of the polymerization reaction appears in the first polymerization reaction. By controlling the polymerization reaction so as to satisfy the condition a), an excessive increase or decrease in reaction temperature of the polymerization reaction can be suppressed. By controlling the polymerization reaction so as to satisfy the condition b) an excessive decrease in the reaction temperature in the second half of the polymerization reaction can be controlled. Furthermore, by controlling the polymerization reaction so as to satisfy the condition c), an excessive increase in reaction temperature of the polymerization reaction can be suppressed.

Specifically, the polymerization reaction can be controlled, for example, by adjusting an amount of supply of the monomer, and/or adjusting the temperatures of the monomer. The method of adjusting an amount of supply of the monomer is not particularly limited. However, such method specifically indicates, for example, a method of adjusting an amount of monomer (the thickness of a aqueous monomer solution) to be supplied onto the upper surface of the transport belt $16$ by adjusting a distance between the nozzle port $18a$ and the transport belt $16$ (nozzle height), transport speed of the transport belt $16$, supply rate of an aqueous monomer solution to the mixing column $15$ from the monomer tank $11$ or a method of adjusting an amount of monomer to be supplied to the upper surface of the transport belt $16$ (thickness of the aqueous monomer solution is maintained constant) by adjusting the concentration of the aqueous monomer solution. By adjusting the amount of monomer supplied to the upper surface of the transport belt $16$, the rate of polymerization reaction can be adjusted. Moreover, by adjusting the thickness of the aqueous monomer solution, an amount of heat released can be adjusted. As a result, a change pattern of the reaction temperatures can be adjusted without terminating the manufacturing line, and the unexpected polymerization reaction can be recovered to the expected one.

The method of "adjusting the temperature of the monomer" is not particularly limited, but specifically indicates the method of adjusting the temperature of the monomer as a raw material and/or the temperature of the monomer supplied to the polymerization reaction, examples of which include: the method of cooling or heating the monomer before being stored in the monomer tank $11$; the method of cooling or heating the monomer tank $11$ or the mixing column $15$, the method of adjusting set temperature of the cooling zone $18a$ and/or the heating zone $18b$, the method of capturing latent heat from the monomer by introducing (spraying) nitrogen gas or the like to the monomer as a raw material and/or the monomer subjected to the polymerization reaction, etc. As a result, changes in pattern of the reaction temperature can be adjusted without terminating the manufacturing line, and the unexpected polymerization reaction can be recovered into the expected one.

Only one kind of the above-listed methods for controlling a polymerization reaction may be adopted, or two or more methods may be suitably combined and adopted. In the case of adopting the polymerization initiator, the polymerization reaction can be controlled also by adjusting an amount of supply of the polymerization initiator. Further, such control of the polymerization reaction can be performed also by adjusting the amount of residual oxygen dissolved in the monomer solution. More specifically, in the case of removing oxygen dissolved in the monomer solution by introducing inert gas such as nitrogen gas or argon gas to the monomer solution, the polymerization reaction can be controlled with ease by suitably adjusting an amount of supply of an inert gas to the aqueous monomer solution.

Figure 3:
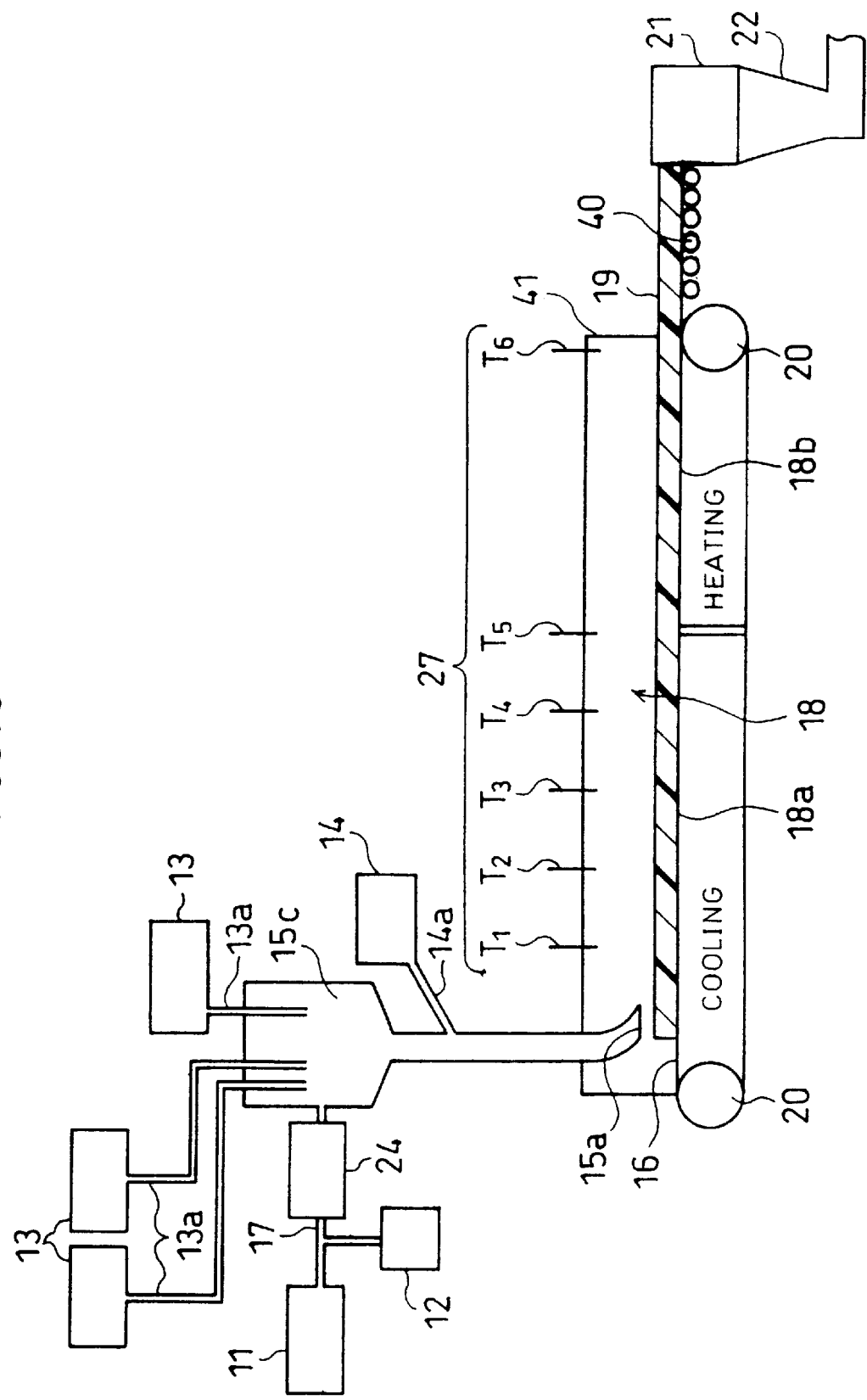
FIG. 3 shows a schematic structure of a modified example of the manufacturing device of FIG. 1.

The gas removing means for removing the inert gas introduced into the monomer solution is not necessarily be the cyclone room. For example, an ultrasonic generating device provided in the monomer supply path $17$ extending from the ejector $12$ to the mixing column $15$ may be adopted as gas removing means. Alternately, as shown in FIG. 3, an ultrasonic radiation vessel $24$ which stores therein an ultrasonic generating device (gas removal means) provided in the monomer supply path $17$ extending from the ejector $12$ to the mixing column $15$ may be adopted. Here, it may be arranged such that the mixing column $15c$ shown in FIG. 3 functions also as the cyclone room. In the mixing column $15c$, a plurality of initiator supply paths $13a$ respectively connected to the initiator tanks $13$ are inserted. Other than that, the manufacturing device shown in FIG. 3 is the same as the manufacturing device shown in FIG. 1.

As described, the water-containing gel $19$ prepared by the method including the step of measuring reaction temperatures of the polymerization reaction and as necessary the step of controlling the polymerization reaction is transported from the polymerization device $18$ by the transport belt $16$. The water-containing gel $19$ thus transported is transported to the gel granulator $21$ by a roller conveyor constituted by a plurality of rotation rolls $40$ provided between the polymerization device $18$ and the gel granulator $21$. The water-containing gel $19$ is then granulated into a size of, for example, about 10 cm square by the gel granulator $21$. Subsequently, the granulated water-containing gel $19$ is pulverized (pulverization process) by a gel pulverizer $22$ such as a kneader, a meat chopper, a hard pulverizer, a shredder, a pelletizer, a screw type extruder, etc., thereby obtaining, for example, pulverized gel having an average particle diameter in a range of from 0.5 mm to 3.0 mm (one type of water-absorbent polymer) After being dried, the pulverized gel may be more finely pulverized by the mill pulverizer as necessary to be water-absorbent particles (one type of water-absorbent polymer) after having undergone a drying process by a dryer (not shown).

The type of the dryer for use in the drying treatment is not particularly limited, and for example, a hot-air dryer, a through-flow band dryer, a stirring dryer, rotary kiln, "Nauta" mixer, etc., may be adopted. The drying temperature for the drying treatment is not particularly limited, but preferably in a range of from 40° C. to 250° C., more preferably in a range of from 100° C. to 240° C., and still more preferably in a range of from 150° C. to 220° C. The drying time is generally within 3 hours, or in some cases within 1 hour.

The type of mill grinder is not particularly limited, and examples of which includes a pin mill, a roll mill, a hammer mill, etc., may be adopted. The particle diameter of the water-absorbent particles is not particularly limited, but desirably, the water-absorbent particles pass a 850-$\mu$m mesh screen. It is also preferable that the water-absorbent particles are classified by 100 to 200-$\mu$m mesh screen, so that the ratio of fine powders having a particle diameter of not more than 150 $\mu$m can be maintained not more than 5 percent. Here, the average particle diameter of the water-absorbent particles is generally in a range of from 200 $\mu$m to 700 $\mu$m, preferably in a range of from 250 $\mu$m to 500 $\mu$m.

As necessary, a surface treatment by a surface crosslinking agent (surfactant) may be applied to the water-containing gel, pulverized gel (including those having undergone the drying process), and water-absorbent particles (water-absorbent polymer). This surface treatment specifically indicates to crosslink the surface portion of the water-absorbent polymer by the surface crosslinking agent that is reactive with functional groups such as carboxyl groups which the water-absorbent polymer generally have. Such surface treatment can be applied, for example, by mixing the surface crosslinking agent with the water-absorbent polymer, and subsequently subjecting it to a heat treatment at temperatures in a range of from 80° C. to 220° C., so as to react the carboxyl group(s) around the surface with the surface crosslinking agent. With this surface treatment, a gel strength and an absorbency under pressure can be improved.

The manufacturing device of the water-absorbent polymer of the present invention is not limited to those shown in FIG. 1 and FIG. 3 as long as an expected polymerization reaction can be performed. For example, a manufacturing device without the heating zone 18$b$ or a manufacturing device without the cooling zone 18$a$ may be adopted, and even a manufacturing device provided with neither of the heating zone 18$b$ nor the cooling zone 18$a$ may be adopted.

Water-absorbent Polymer Manufacturing Device 2

Figure 4:
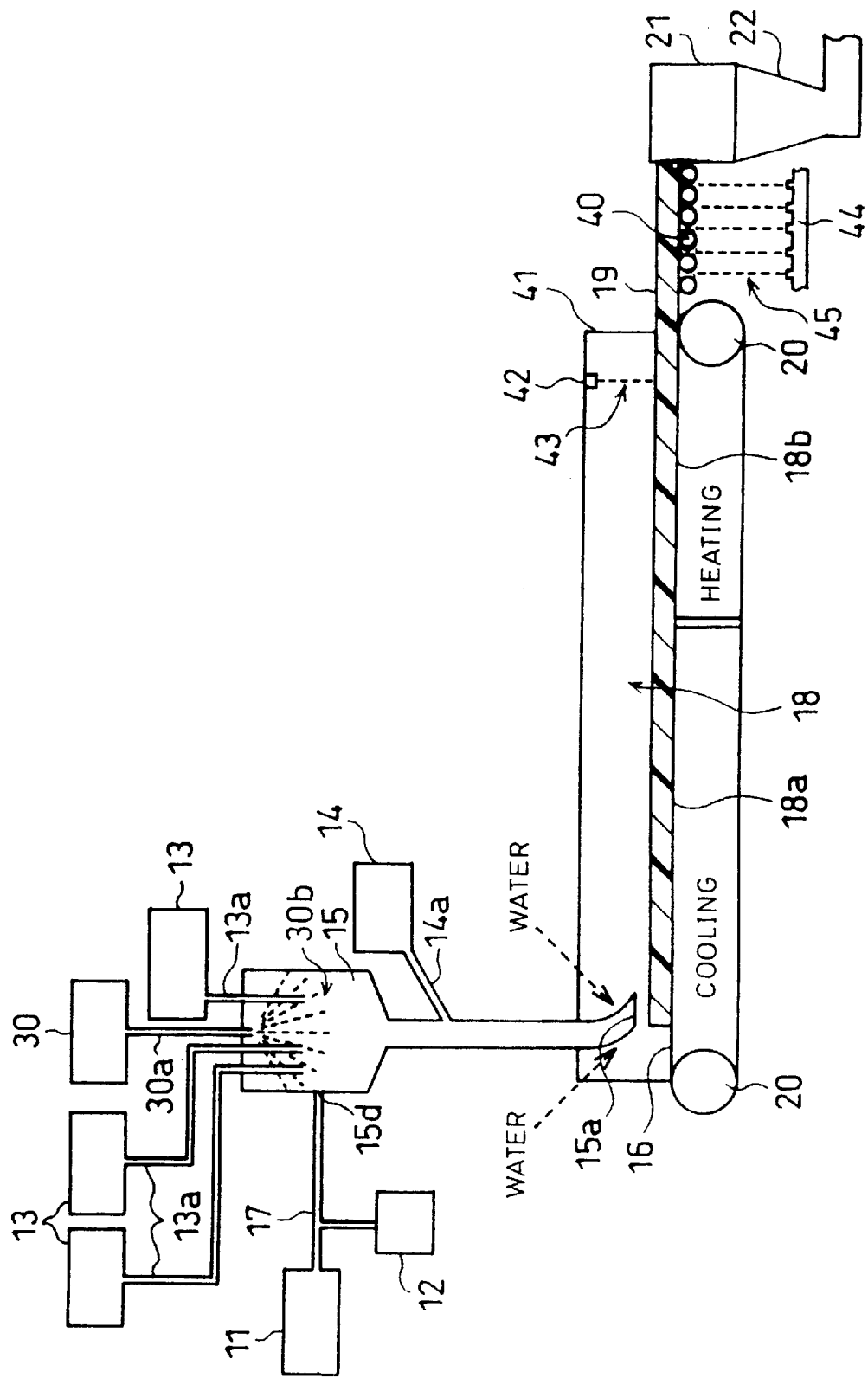
FIG. 4 shows a schematic structure of another example of a manufacturing device of a water-absorbent polymer adopted in the manufacturing method of the present invention.

An example of devices which permit a water-absorbent polymer including at least one of the steps A to D to be manufactured in a continuous manner is shown in FIG. 4. This device is provided with means for executing the step (B) and the step (D). Members having the same functions and structures as those shown in FIG. 1 and FIG. 3 will be designated by the same reference numerals, and the explanations thereof shall be omitted here.

As shown in FIG. 4, the manufacturing device includes a monomer tank 11, an ejector 12, a plurality of initiating agent tanks 13 for respectively storing a polymerization initiator, an oxidizing initiator (redox initiator), a reducing agent tank 14 for storing the reducing agent such as a redox initiator, a mixing column (mixing vessel) 15 for mixing the monomer with the polymerization initiator (including a redox initiator composed of oxidizing initiator and the reducing agent), and a transport belt (transport means) 16 for continuously transporting the monomer supplied through the nozzle port (discharge port) 15$a$ provided in the mixing column 15 in a transport direction. A spray 30$a$ connected to a water storage tank 30 is provided as supply means for water 30$b$ in an upper part of the mixing column. In the manufacturing device shown in FIG. 4, the polymerization section 18 serves as the polymerization device.

In the monomer tank 11, stored is a monomer, for example, in a form of an aqueous solution (aqueous monomer solution). After the oxygen dissolved in the aqueous monomer solution is removed by an inert gas introduced therein by the ejector 12, the aqueous monomer solution is placed in the mixing column 15 via the monomer supply path 17 and the supply port 15$d$. Further, at or before the timing of supplying the aqueous monomer solution, water 30$b$ starts being sprayed in a continuous manner onto the inner surface of the mixing column 15 by means of the spray 30$a$.

Figure 5:
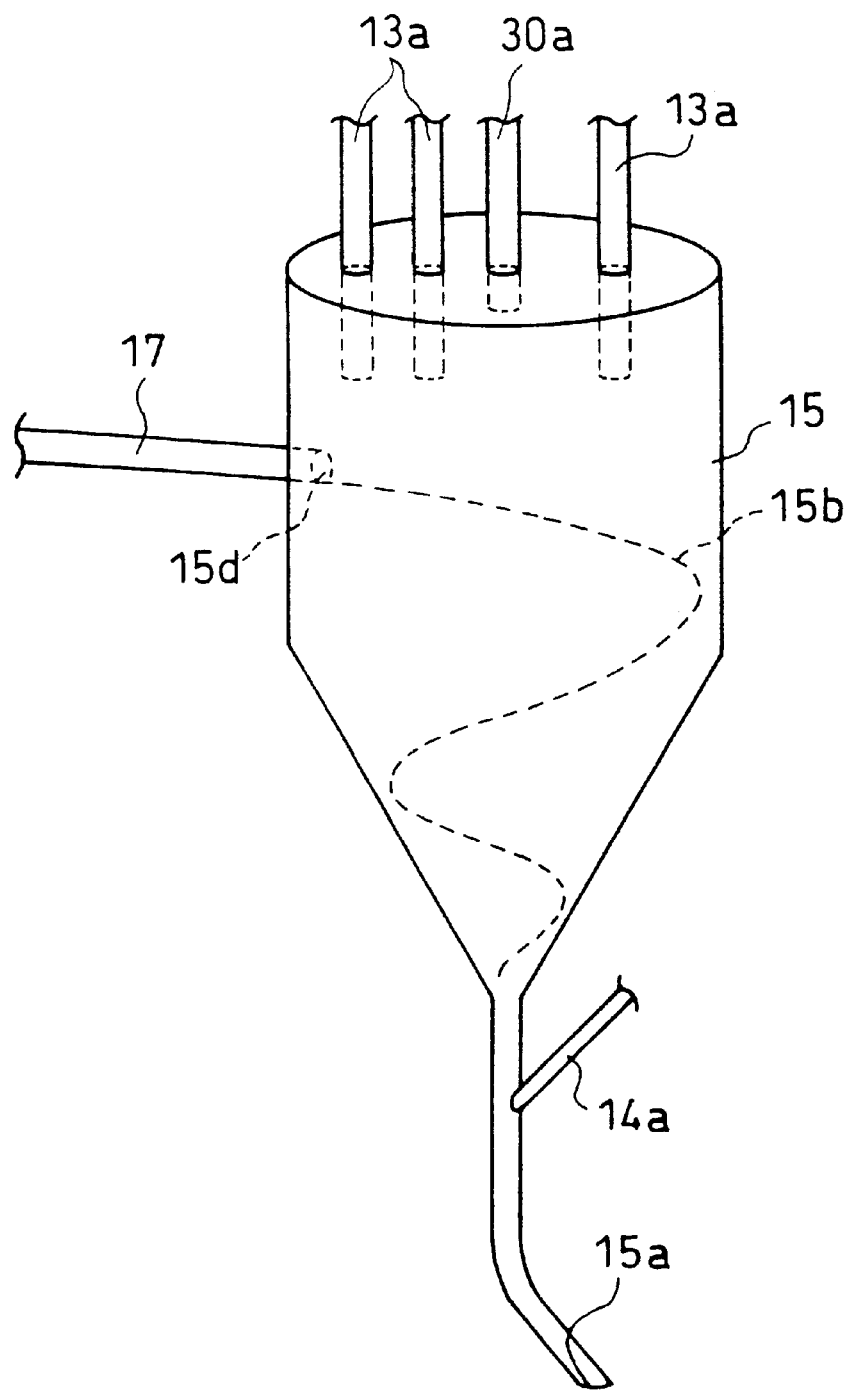
FIG. 5 is an enlarged view showing a schematic structure of a mixing column (serving also as cyclone room) provided in the manufacturing device of FIG. 4.

As shown in FIG. 5, the mixing column 15 includes 1) a first mixing section (serving as a cyclone room as gas removing device) in which an aqueous monomer solution flows along a spiral line 15$b$ indicated in the Figure; and a second mixing section following the first mixing section. The first mixing section is, for example, a combination of a cylinder shaped inner surface and a truncated cone shaped inner surface, and an area thereof surrounded by a cross line between the inner surface and horizontal plane is the largest at the top and the smallest at the bottom. The second mixing section, for example, has a cappillar shape of a constant cross section, and a lower part thereof being bent with respect to the vertical line (specifically, in the same direction as the transport direction of the transport belt 16).

Namely, the mixing column 15 corresponds to a container having such shape that the smallest area (an area surrounded by a cross line between an inner surface positioned above the bent portion and the horizontal plane of the second mixing section) of the mixing column 15 surrounded by a cross line between the inner surface of the container and a horizontal plane is positioned below a plane including the supply port and above a plane including the discharge port. As will be described below, the second mixing section serves also as the inlet tube for supplying the aqueous monomer solution to the polymerization section.

In the first mixing section, bubbles of inert gas are removed (deaerated) from the aqueous monomer solution supplied through the supply port 15$d$. When carrying out the removal of inert gas, at the same time, for example, an oxidizing initiator such as sodium persulfate (NaPs), and as necessary, a polymerization initiator such as an azo initiator are supplied and mixed with the aqueous monomer solution.

As described, in the mixing column 15, at or before the timing of supplying the monomer solution, water 30$b$ starts being sprayed by the spray 30$a$ onto the inner surface of the mixing column 15. In this way, the aqueous monomer solution adhering to or remaining in the first mixing section which also serves as a cyclone room can be prevented, and adhesion and growth of the polymer of the monomer can be prevented.

The aqueous monomer solution undergone the removal of inert gas, with which the oxidizing initiator, etc., is mixed, is subsequently supplied into the second mixing section. In the second mixing section, a reducing agent such as, for example, L-ascorbic acid (L-A), etc., is supplied and line mixed with the aqueous monomer solution via the reducing agent supplying path 14$a$. As a result, the monomer, the oxidizing initiator, and the reducing agent are mixed, and the polymerization reaction is initiated. A suitable mixing timing for a combination of an oxidizing initiator and a reducing agent, which serves as a redox initiator and a suitable mixing timing for a redox initiator and an azo initiator as a thermal decomposable initiator are as explained earlier for the manufacturing device 1.

Thereafter, the aqueous monomer solution supplied in the mixing column 15 is fed on the upper surface of the transfer belt 16 provided in the polymerization device 18 via the nozzle port 15*a* formed in the second mixing section which serves also as the inlet tube. In this state, at or before the timing of supplying the aqueous monomer solution into the polymerization device 18 through the inlet tube, 1) water 30*b* starts being sprayed from the spray 30*a* to be run onto the inner surface of the inlet tube and 2) water 30*b* is supplied in its flow discontinuously onto the outer surface of the inlet tube by means of water supply means (not shown). In this way, the aqueous monomer solution adhering to or remaining in the inlet tube can be prevented, and adhesion and maturation of the polymer of the monomer can be prevented.

The height of the position from which the aqueous monomer solution is supplied, i.e., the minimum distance between the nozzle port 15*a* and the upper surface of the transport belt 16 is not particularly limited but preferably within a range of from 0.5 cm to 50 cm. For the height of not less than 0.5 cm, such problem that the aqueous monomer solution is spread out from the upper surface of the transfer belt 16 and adheres to the leading end of the inlet tube can be prevented. For the height of not more than 50 cm, for example, such problem that the monomer solution is spread out and adheres to the side walls of the polymerization device 18 can be prevented.

As in the case of the manufacturing devices shown in FIG. 1 and FIG. 3, the leading end of inlet tube in this example is also bent in the transport direction of the aqueous monomer solution by the transport belt 16. An amount of supply (feed amount: corresponding to a solution thickness in the case of a constant width of the nozzle port 15*a*) of the aqueous monomer solution fed onto the upper surface of the transport belt 16 is not particularly limited, but preferably in a range of from 1 mm to 50 mm, more preferably in a range of from 10 mm to 40 mm, and still more preferably in a range of from 20 mm to 30 mm. As long as the solution is fed to the thickness of not less than 1 mm, the water-absorbent polymer can be manufactured at industrial level. Additionally, by feeding the solution to the thickness of not more than 50 mm, heat generated from the polymerization reaction can be removed with ease, and bumping out in the polymerization reaction, an increase in soluble component in the resulting water-absorbent polymer, and the reduction in the gel strength of the water-absorbent polymer can be prevented.

The transport belt 16 is a belt conveyer of an endless belt type which is supported and driven by drive axes 20 which rotate at constant transport rate. The upper surface of the transport belt 16 is covered with a hood 41 provided thereabove, and is replaced with nitrogen gas. Additionally, a predetermined region on the front side in the transport direction (cooling zone 18*a*) of the upper surface of the transport belt 16 is cooled off, while a predetermined region on the back side in the transport direction (heating zone 18*b*) is heated. Here, "heating" and "cooling" are determined based on the temperature of the reaction system. For the conditions and the methods of heating and cooling the upper surface of the transport belt 16, those given in reference to the manufacturing device 1 can be applied.

Figure 6:
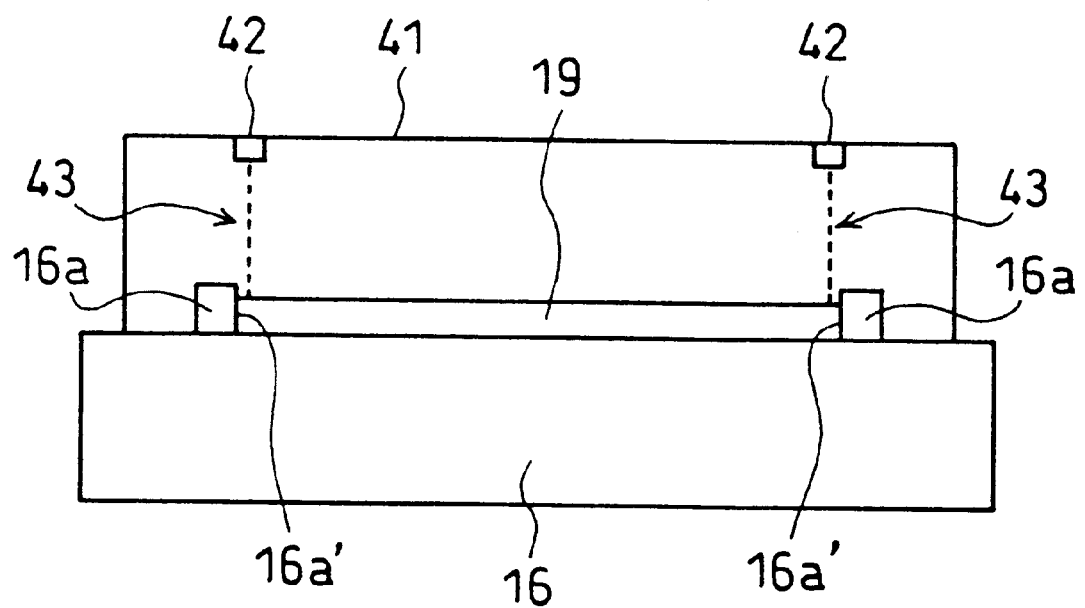
FIG. 6 is a front view of a transport belt provided in a polymerization device of the manufacturing device of FIG. 4 viewed in a transport direction.

As shown in FIG. 6, the transport belt 16 also has side walls 16*a* formed on both sides in a widthwise direction. These side walls 16*a* are provided for preventing the monomer solution fed on the upper surface of the transport belt 16 from being spilled therefrom. The height of the side walls 16*a* is not particularly limited and can be set to a desirable height for the thickness of the aqueous monomer solution supplied, but generally, in a range of from 5 mm to 100 mm.

The material for the side walls 16*a* is not particularly limited, provided deterioration and melting by contacting the aqueous monomer solution can be avoided, examples of which include: nitrile rubber, silicone rubber, chloroprene rubber, fluorine-containing rubber, fluorine plastic, etc. It should be noted here that although it is preferable to provide these side walls 16*a*, they are not an essential component of the present invention.

The monomer fed on the upper surface of the transport belt 16 via the nozzle port 15*a* is subjected to a static polymerization to be performed in a continuous manner. The polymerization reaction on the upper surface of the transport belt 16 is performed under cooling in the cooling zone 18*a* for a predetermined time and subsequently under heating in the heating zone 18*b* for a predetermined time. As a result, the aqueous monomer solution subjected to the polymerization reaction is transported in the polymerization device 18 by the transport belt 16, and a polymerization is performed at first while suppressing an excessive rise in reaction temperature. Subsequently, the polymerization and maturing process be performed while suppressing an excessive reduction in the reaction temperature, thereby producing a water-containing gel (one type of water-absorbent polymer) 19.

As shown in FIG. 4 and FIG. 6, water 43 is added dropwise by the dropping funnels 42 (water supply means) with respect to the water-containing gel 19 in a vicinity of the discharge port of the polymerization device 18. The water 43 is supplied to around the portion of the water containing gel 19, which contacts and is supported by the inner surfaces (support faces) 16*a*' of the side walls 16*a*. As a result, the water-containing gel (polymer gel) 19 can be prevented from adhering to the side walls 16*a* as the both end portions of the water-containing gel 19 in the widthwise direction being slightly swollen. Moreover, the water-containing gel 19 once adhered to the side walls 16*a* can be separated therefrom. Therefore, the water-containing gel 19 can be separated from the support faces of the transport belt 16 with ease without generating flaw or cut (crack) at both ends.

For the polymerization device 18, water may be supplied 1) in a spacing between the upper surface of the transport belt 16 and the water-containing gel 19, or in a spacing between the inner surfaces 16*a*' of the side walls 16*a* and the water-containing gel 19. In this case, it is preferable that water be supplied in a spacing between the upper surface of the transport belt 16 or the side portions of the inner sides 16*a*' at the back in the transport direction of the water-containing gel 19, and the water-containing gel 19. In the case of supplying water to the water-containing gel 19, it is more preferable to supply water to the side portions at the back in the transport direction of the water-containing gel 19. By supplying water in the forgoing manner, the water-containing gel 19 can be separated from the support face of the transport belt 16 with ease.

The water-containing gel 19 thus separated from the support face of the transport belt 16 is passed on a roller conveyer (transport means) composed of a plurality of rotation rolls (transport means) 40 provided between the polymerization device 18 and the gel granulator 21. Under the rotation rolls 40, provided is a water spray (water supply means) 44 for spraying water 45 upwards. This water spray 44 continuously supplies water to the surfaces (support face) of the rotation rolls 40 and the bottom surface of the water-containing gel 19 supported by the surfaces (support face) of the rolls 40. As a result, 1) a water layer is formed between the surfaces of the rolls 40 and the lower surface of the water-containing gel, and 2) the lower surface of the water-containing gel 19 is swelled by absorbing water, thereby suppressing such problem of the water-containing gel 19 adhering onto the surfaces of the rolls 40. Moreover, this water-containing gel 19 is free from flaw or crack, and thus would not be rolled in or entrapped by the rolls 40. Furthermore, when feeding the water-containing gel 19 to the gel granulator 21, the water-containing gel 19 would not be entrapped in vicinity of the supply port of the gel granulator 21.

The water-containing gel 19 supplied to the gel granulator 21 is granulated into a size of, for example, about 10 cm square by the gel granulator 21. Subsequently, the granulated water-containing gel 19 is subjected to the pulverization treatment by the gel pulverizer 22 thereby obtaining, for example, pulverized gel having an average particle diameter in a range of from 0.5 mm to 3. 0 mm (one type of water-absorbent polymer). After a heat treatment is applied to the pulverized gel, it may be more finely pulverized by the mill pulverizer (not shown) as necessary to be water-absorbent particles having an average particle diameter in a range of from 250 $\mu$m to 500 $\mu$m (one type of water-absorbent polymer).

As necessary, the above crosslinking agent may be used in the polymerization reaction.

The manufacturing device for use in the manufacturing method of the present invention is not limited to the above-explained manufacturing device shown in FIG. 4, and for example, those provided with a mixing device for mixing the monomer solution and the polymerization initiator, and a gas removing device such as a cyclone room separately, and those provided with either one of the mixing device and the gas removing device may be adopted. Further, a manufacturing device of a batch type may be adopted as well.

Furthermore, although the above explanations have been give through the cases of the manufacturing devices of a water-absorbent polymer provided with functions of performing not all but some of the above-explained steps (A) to (D). However, for example, by installing infrared radiation thermometers $T_1$ to $T_6$ shown in FIG. 1 or FIG. 3 in the polymerizing device of the manufacturing device shown in FIG. 4, a manufacturing device for manufacturing a water-absorbent polymer in a continuous manner, which is capable of performing all of the four steps (A) to (D), can be achieved without difficulties.

The following examples are presented to explain the present invention in greater detail, but not to limit the present invention. Among the below-explained examples, examples 1 to 3 are focused on the step (A) for removing the inert gas supplied to the monomer solution. A comparative example 1 is a comparative example of example 1. On the other hand, examples 4, 10 and 11 are focused on particularly the step (A), the step (B) of supplying a monomer solution and supplying water for the purpose of preventing unwanted adhesion of the solution, and the step (D) of transporting the water-containing gel while supplying water. Example 5 is focused on the above step (A) and the step (D). Example 9 is focused on the above step (A) and the step (B). Lastly, examples 6 to 8 are focused on the step (C) of detecting reaction temperatures of polymerization reactions in non-contact manner. Firstly, tests for evaluating various properties to be performed in examples 1 to 3 and comparative example 1 will be explained.

Light Transmittance

A transmittance of light having a wavelength of 700 nm was measured with respect to a water-absorbent polymer (water-containing gel) by measuring spectral absorbance of the water-absorbent polymer. For a measuring device, UV3100PC (available from Shimazu Seisakusho Co., Ltd.) was adopted. This measurement of transmittance permitted an amount of inert gas contained in a monomer solution to be measured in an indirect manner.

Measurement of Absorbency

Absorbency without pressure was measured in the manner disclosed in U.S. Pat. No. 6,071,976, and the water absorption time was set to 20 minutes.

A measurement is performed with respect to water-absorbent particles (one type of water-absorbent polymer) obtained by granulating, pulverizing, drying, and (finely) grinding the water-absorbent polymer (water-containing gel being dried). 0.2 g of water-absorbent dry particles was uniformly placed into a tea bag (60 mm×60 mm) made of non-woven fabric, and was immersed into a 0.9 percent by weight physiological saline solution for 20 minutes. Then, the tea bag was taken out, and was subjected to hydro-extraction for 3 minutes at 250 G (250 cm/sec$^2$) using a centrifugal separator, and the weight W1 (g) of the tea bag was measured.

The above process was repeated with respect to an empty tea bag (60 mm×60 mm) made of non-woven fabric, and the weight W0 (g) of the empty tea-bag was measured. Then, the absorbency (g/g) was calculated Absorbency $(g/g)=(W1-W0)$/Weight of water-absorbent particles (0.2 g)

Measurement of Absorbency Under Pressure

Using the measuring device as disclosed in U.S. Pat. No. 6,071,976, European Patent No. 0885917, and European Patent No. 0811636, absorbency under pressure of water-absorbent polymer powders was measured with respect to 0.7 psi (around 4.83 kPa) physiological saline solution.

Namely, measurement of absorbency under pressure was performed with respect to 0.900 g of water-absorbent polymer particles while maintaining it under a uniformly applied pressure of 0.7 psi, and the weight W2 (g) of the physiological saline solution absorbed by the water-absorbent polymer particles was measured for 60 minutes by means of a balance. Using the above weight W2 (g), the absorbency under pressure (g/g) was calculated on the basis of the following equation (b) in 60 minutes after the water-absorbent powders started absorbing the physiological saline solution, which was determined to be the absorbency under pressure of 0.7 psi.

(b): Absorbency under pressure (g/g) Weight W2 (g)/ Weight of water-absorbent polymer particles (g)

Measurement of Amount of Fine Powders

After applying a mechanical damage (to be explained in Example 1), the weight (W2) of water-absorbent fine powders were sieved by a 150-$\mu$m mesh screen, and fragments passed through the mesh screen were collected as fine powders. The ratio of fine powders was calculated by dividing the weight (W3) of fine powders device by the weight (W2) of water-absorbent particles, i.e., on the basis of the following equation:

Amount of fine powders $(\%)=(W3/W2)\times 100$.

EXAMPLE 1

A water-absorbent polymer was prepared using the manufacturing device shown in FIG. 3. In this example, a stainless endless belt with a width of 60 cm and a length (an interval between centers of drive axes 20) of 24 m was adopted for the transport belt 16. The transport speed of this transport belt 16 was 1 m/minute, and the lengths of the cooling zone 18a, and the heating zone 18b were 15 m and 9 m respectively. The cooling zone 18a was cooled by cool water at 15° C. supplied the cooling device, and the heating zone 18b was heated by hot water at 70° C. supplied from the heating device.

For a raw material, 70 mole percent neutralized sodium acrylate (hydrophilic monomer) was used. Firstly, an aqueous monomer solution was prepared by adding polyethylene glycol diacrylate (average added mole number=8) as a cross-linking agent to 39 percent by weight of aqueous solution of sodium acrylate, and the resulting aqueous monomer solution was fed into the monomer tank 11. Polyethylene glycol diacrylate was added in a ratio of 0.1 mole based on 1 mole of above neutralized sodium acrylate. Then, a nitrogen gas (inert gas) was continuously introduced through a nozzle by the ejector 12 at 3 L per minute into a flow of the aqueous monomer solution (0.95 L per minute) fed from the monomer tank 11. In this way, oxygen dissolved in the aqueous monomer solution was removed continuously. As a result, an amount of oxygen dissolved in the turbid aqueous monomer solution in white color in which uncountable number of bubbles of nitrogen gas of particles having a diameter of from several $\mu$m to several hundreds of am were dispersed was 0.3 mg/L.

Subsequently, as the step (A), the aqueous monomer solution was supplied to an ultrasonic radiation vessel 24, and ultrasonic wave having a frequency of 38 kHz was applied. An average retention time (equivalent to an average ultrasonic application time) of the aqueous monomer solution in the ultrasonic radiation vessel 24 was 2.4 minutes. In this state, the temperature of the aqueous monomer solution was 18° C.

After removing nitrogen gas with an application of ultrasonic, the aqueous monomer solution become colorless and transparent with no bubble, and then was supplied to the mixing column 15c (which was not served as cyclone room). To the mixing column 15c, added were 0.12 g of sodium persulfate (oxidizing initiator), 0.0015 g of hydrogen peroxide (oxidizing initiator) based on 1 mole of 70 percent neutralized sodium acrylate from the separately provided initiator tanks 13 respectively, and subsequently was added 0.0018 g of L-ascorbic acid (reducing agent) based on 1 mole of the neutralized sodium acrylate from the reducing agent tank 14, all to be mixed with the aqueous monomer solution.

Then, the aqueous monomer solution was continuously fed onto the upper surface of the transport belt 16 so as to have a thickness of 23 mm via the nozzle port 15a, and a polymerization reaction was performed. On the transport belt 16, the polymerization of sodium acrylate was started about 30 seconds after the supply of the aqueous monomer solution, and the polymerization peak appeared in 9 minutes. In this state, the peak temperature was 98° C. Then, the polymerization reaction was continued for 15 minutes after the polymerization peak. As a result, the water-containing gel (water-containing gel-like crosslinked polymer) one type of water-absorbent polymer) 19 was obtained. After scraping the water-containing gel 19 from the upper surface of the transport belt 16, the above-explained transmittance of light was measured, which was found to be 72 percent.

The water-containing gel 19 thus scraped from the upper surface of the transport belt 16 was granulated into a size of, for example, about 10 cm square by the gel granulator 21. The resulting granulated water-containing gel 19 was then placed in screw-type extruder (corresponding to gel pulverizer 22) with spiral protrusions inside the main body. Then, the water-containing gel 19 was extruded through a porous plate with pores having a diameter of 16 mm equipped in the screw-type extruder, thereby obtaining pulverized gel (not shown). The average particle diameter of the pulverized gel was 1.5 mm.

After hot air drying process was applied for 43 minutes at 170° C., the pulverized gel 19 was placed in a roll mill (corresponding to mill type granulator (not shown)), to granulate the pulverized gel 19 into the water-absorbent particles with a particle diameter of not more than 850 $\mu$m were obtained. Then, the water-absorbent particles were classified by a 150-$\mu$m mesh screen, and fine powders having a diameter of not more than 150 $\mu$m was removed. The resulting water-absorbent particles thus classified had a weight average particle diameter of about 400 $\mu$m.

Thereafter, an aqueous solution of a surface cross-linking agent composed of 0.5 parts by weight of 1,4-butanediol, 0.5 parts by weight of propylene glycol, 1 part by weight of isopropyl alcohol, and 3 parts by weight of water was mixed based on 100 parts by weight of water-absorbent particles, and the water-absorbent particles mixed with the surface cross-linking agent was subjected to heat-treatment at 210° C. for 30 minutes, thereby obtaining water-absorbent particles A as one type of water-absorbent polymer of the present invention.

Then, after applying mechanical damage on the water-absorbent particles A, the absorbency, the absorbency under pressure, and an amount of fine powders were measured. Based on the results of these measurements, the properties of the water-absorbent polymer of the present invention were evaluated. The results of measurements of various properties were shown in Table 1 below with the results of measurement of light transmittance.

(Mechanical Damage)

In a glass container ("mayonnaise bottle" (product name: A-29) available from Yamamura Glass Co., Ltd.), placed were 30 g of water-absorbent particles A and 30 g of glass beads (soda lime glass beads for use in precision distillation filling, with a diameter of about 6 mm). The glass container was then fixed to a dispersing apparatus (dispersing apparatus for experiment use No. 488 available from Toyo Seiki Co., Ltd.) by being pinched between clamps provided in the dispersing apparatus (please refer to the impact force application device as disclosed in U.S. Pat. No. 6,071,976). In this state, the glass container was vibrated for 30 minutes at a vibration velocity of 750 c.p.m at 100 v/60 Hz. As a result, the glass container was tilted by 12.5° in both right and left directions respectively (by 25° in total) with respect to the mount face of the cramps, and at the same time was shaken by 8 mm forward and backward respectively. In this way, the same damage could be applied to the water-absorbent particles A in the glass container as the damage applied in its pneumatic conveying.

COMPARATIVE EXAMPLE 1

In the comparative example 1, comparative water-absorbent particles (hereinafter referred to as water-absorbent particles B) was prepared, and the light transmittance of the water-containing gel was measured in the same manner as Example 1 except that ultrasonic was not applied. Then, after applying a mechanical damage on the water-absorbent particles B in the same manner as Example 1, the absorbency, absorbency under pressure, and an amount of the water-absorbent particles were measured. The results of measurements of these properties were shown also in Table 1 together with the result of measurement of the light transmittance.

EXAMPLE 2

Water-absorbent particles (hereinafter referred to as water-absorbent particles C) were manufactured under the same condition as Example 1 except that as the step (A), nitrogen gas (inert gas) was introduced through nozzle at 9 L per minute, and the light transmittance of the water-containing gel 19 was measured. Then, after applying a mechanical damage on the water-absorbent particles C in the same manner as Example 1, absorbency, absorbency under pressure, and an amount of fine powders were measured. Based on the results of measurements, properties of the water-absorbent polymer of the present invention were evaluated. The results of measurements of these properties were shown also in Table 1 together with the result of measurement of the light transmittance.

EXAMPLE 3

A water-absorbent polymer was prepared using the manufacturing device shown in FIG. 1. The conditions for the transport belt 16, the cooling zone 18a and the heating zone 18b in this example were the same as those of Example 1.

As a raw material of the water-absorbent polymer, 65 mole percent neutralized sodium acrylate (monomer) was used. Firstly, an aqueous monomer solution was prepared by adding polyethylene glycol diacrylate (average added mole number=8) as a cross-linking agent to 35 percent by weight of aqueous solution of the above neutralized sodium acrylate, and the resulting aqueous monomer solution was fed in the monomer tank 11. Polyethylene glycol diacrylate was added in a ratio of 0.04 mole based on 1 mole of the above 65 mole percent neutralized sodium acrylate. Then, as the step (A), a nitrogen gas (inert gas) was continuously introduced through a nozzle by the ejector 12 at 1 L per min. into a flow of the aqueous monomer solution (0.95 L per minute) supplied from the monomer tank 11. In this way, oxygen dissolved in the aqueous monomer solution was removed continuously. As a result, an amount of oxygen dissolved in the aqueous monomer solution in which uncountable number of bubbles of nitrogen gas having a particle diameter in a range of from several $\mu$m to several hundreds of $\mu$m were dispersed was 0.3 mg/L.

As the step (A), the aqueous monomer solution was then placed in the mixing column 15 whose inner surface was Teflon-coated. As shown in FIG. 2, the mixing section includes 1) the first mixing section (serving also as a cyclone room) in which the aqueous monomer solution flows along a spiral line 15b shown in FIG. 2, and 2) the second mixing section connected to the bottom end of the first mixing section.

In the first mixing section, added dropwise from the respective initiator tanks 13 (in FIG. 2, only one of the tanks 13 is shown) were 0.02 g of 0.5 percent by weight of sodium persulfate aqueous solution (oxidizing initiator), 0.002 g of 0.1 percent hydrogen peroxide solution (oxidizing initiator) and 0.02 g of 0.5 percent by weight of 2,2'-azobis(2-amidinopropane)dihydrochloride solution (thermal decomposition initiator) based on 1 mole of sodium acrylate. Then, the step of deaerating nitrogen gas from the monomer solution by generating circulating flow of the aqueous monomer solution and the step of mixing the aqueous monomer solution with the oxidating initiator and the thermal decomposable initiator were performed at the same time.

The aqueous monomer solution ejected from the first mixing section (serving also as a cyclone room) was supplied to the second mixing section. In the second mixing section, added from the reducing agent tank 14 were 0.0014 g of 0.005 percent by weight of L-ascorbic acid (reducing agent) based on to 1 mole of the sodium acrylate and was line-mixed with the aqueous monomer solution. Then, the aqueous monomer solution having nitrogen gas removed therefrom (deaerated nitrogen gas) was continuously fed onto the upper surface of the transport belt 16 so as to have a thickness of 25 mm via the nozzle port 15a (continuous supply), and a polymerization reaction was performed. On the transport belt 16, the polymerization of the above neutralized sodium acrylate was started in around 3 minutes after the supply of the aqueous monomer solution, and the polymerization peak appeared in 12 minutes. In this state, the peak temperature was 85° C. Then, the polymerization reaction was continued for 12 minutes after the polymerization peak. As a result, the water-containing gel (one type of water-absorbent polymer) 19 was obtained. After scraping the water-containing gel 19 from the upper surface of the transport belt 16, the above-explained transmittance of light was measured, which was found to be 50 percent.

The water-containing gel 19 thus scraped from the upper surface of the transport belt 16 was granulated into a size of, for example, about 10 cm square by the gel granulator 21. The resulting granulated water-containing gel 19 was then placed in the screw-type extruder (corresponding to gel pulverizer 22) with spiral protrusions inside the main body. Then, the water-containing gel 19 was extruded through a porous plate with pores having a diameter of 9.5 mm equipped in the screw-type extruder, thereby obtaining pulverized gel (not shown). The average particle diameter of the pulverized gel was 1.7 mm.

After hot air drying process was applied for 43 minutes at 170° C., the pulverized gel was placed in a roll mill (corresponding to mill type granulator (not shown)), where the pulverized gel was granulated into the water-absorbent particles with a particle diameter of not more than 850 $\mu$m. Then, the water-absorbent fine powders were classified by a 150-$\mu$m mesh screen, and fine powders having a diameter of not more than 150 $\mu$m was removed. The resulting water-absorbent particles thus classified had an average particle diameter of about 300 $\mu$m.

Thereafter, an aqueous solution composed of a surface cross-linking agent was prepared by mixing 0.5 parts by weight of 1,4-butanediol, 0.5 parts by weight of propylene glycol, 1 part by weight of isopropyl alcohol, and 3 parts by weight of water was mixed with 100 parts by weight of water-absorbent particles, and was subjected to heat-treatment at 195° C. for 40 minutes, thereby obtaining water-absorbent particles D as one type of water-absorbent polymer of the present invention. Then, after applying mechanical damage on the water-absorbent particles D, the absorbency, the absorbency under pressure, and an amount of fine powders were measured. Based on the results of these measurements, properties of the water-absorbent polymer of the present invention were evaluated. The results of measurements were shown in Table 1 below with the results of measurement of light transmittance.

TABLE 1

|  | Light Transmittance (%) | Absorbency (g/g) | Absorbency under Pressure (g/g) | Amount of Fine Powders (wt %) |
|---|---|---|---|---|
| Example 1 | 72 | 26 | 25 | 1 |
| Comp. Example 1 | 6 | 26 | 23 | 3 |
| Example 2 | 50 | 26 | 25 | 2 |
| Example 3 | 50 | 35 | 28 | 2 |

As shown in Table 1, the water-absorbent particles A, C and D resulting from Examples 1 to 31) showed higher light transmittances in the state of water-containing gel as compared to the comparative example 1. This proved that the water-absorbent particles A, C and D contained smaller amount of residual bubbles as compared to the comparative water-absorbent particles B. Moreover, with applied mechanical damages expected for pneumatic conveying, the water-absorbent particles A, C and D had 2) contained smaller amount of fine powders (scaly fragment), and showed 3) desirable water-absorbency and absorbency under pressure.

EXAMPLE 4

A water-absorbent polymer was prepared using the manufacturing device shown in FIGS. 4 to 6. The conditions for the transport belt 16 (length, transport speed, and material), the cooling zone 18a and the heating zone 18b (lengths, cooling/heating conditions) in this example were the same as those of Example 1. On both sides of the transport belt 16 in the widthwise direction, side walls 16a with a height of about 5 cm were formed at an interval of 60 cm.

As a raw material of the water-absorbent polymer, 65 percent neutralized sodium acrylate (hydrophilic monomer: water-soluble ethylenically unsaturated monomer) was used. Firstly, an aqueous monomer solution was prepared by adding polyethylene glycol diacrylate (average added mole number=8) as a cross-linking agent to 35 percent by weight of an aqueous monomer solution of sodium acrylate, and the resulting aqueous monomer solution was placed in the monomer tank 11. The polyethylene glycol diacrylate was added in a ratio of 0.04 mole based on 1 mole of the above neutralized sodium acrylate. Then, a nitrogen gas (inert gas) was continuously introduced through a nozzle by the ejector 12 at 1 L per minute into a flow of the aqueous monomer solution supplied (0.95 L per minute) from the monomer tank 11. In this way, oxygen dissolved in the aqueous monomer solution was removed continuously. As a result, an amount of oxygen dissolved in the aqueous monomer solution in which uncountable number of bubbles of nitrogen gas having a particle diameter in a range of from several $\mu$m to several hundreds of $\mu$m were dispersed was 0.3 mg/L.

Then, as the step (A), the aqueous monomer solution was placed in the mixing column 15 whose inner surface was coated with Teflon. As shown in FIG. 5, the mixing section includes 1) the first mixing section (serving also as a cyclone room) in which the aqueous solution flows along a spiral line 15b shown in FIG. 5, and 2) the second mixing section (serving also as the inlet tube) connected to the bottom end of the first mixing section. In the mixing column 15, throughout the period directly before the supply of the aqueous monomer solution till directly before the completion of the supply of the aqueous monomer solution, water 30b was sprayed at 10 ml per minute continuously by the spray 30a.

In the first mixing section, simultaneously added dropwise from respective initiator tanks 13 were 0.02 g of 0.5 percent by weight of sodium persulfate aqueous solution, 0.001 g of 0.14 percent by weight of hydrogen peroxide aqueous solution (oxidizing initiator) and 0.02 g of 0.5 percent by weight of 2,2'-azobis(2-amidinopropane) dihydrochloride solution (thermal decomposition initiator) based on 1 mole of the above neutralized sodium acrylate. Then, the step (step (A)) of deaerating nitrogen gas from the aqueous monomer solution by generating circulating flow and the step of mixing the aqueous monomer solution with the thermal decomposable initiator were performed at the same time.

The aqueous monomer solution ejected from the first mixing section (serving also as a cyclone room) was supplied in the second mixing section (serving also as the introduction tube). In the second mixing section, added from the reducing agent tank 14 was 0.002 g of 0.2 percent by weight of L-ascorbic acid aqueous solution (reducing agent) based on 1 mole of above neutralized sodium acrylate and was line-mixed with the aqueous monomer solution.

Then, the aqueous monomer solution having nitrogen gas removed therefrom (deaerated nitrogen gas) was continuously fed on the upper surface of the transport belt 16 so as to have a thickness of 25 mm via the nozzle port 15a (continuous introduction), and a polymerization reaction was performed. In this state, the aqueous monomer solution was introduced to the height of about 1 cm. Both the inner and outer surfaces of the inlet tube were coated with Teflon, and as the step (B), water started being supplied discontinuously from above with respect to the outer surface of the inlet tube placed in the polymerization device 18 prior to the supply of the aqueous monomer solution in the polymerization device 18.

On the transport belt 16, the polymerization of the above neutralized sodium acrylate was started 30 seconds after the supply of the aqueous monomer solution, and the polymerization peak appeared in 9 minutes. In this example, the peak temperature was 85° C. Then, the polymerization reaction was continued for 15 minutes after the polymerization peak. As a result, the water-containing gel (one type of water-absorbent polymer) 19 was obtained.

To the water-containing gel 19, as the step (D) water was added dropwise from the dropping funnels (water supply means) 42 at 5 ml/min. The water-containing gel 19 separated from the support face of the transport belt 16 was received by the roller conveyer (transport means) composed of a plurality of rotation rolls (transport means) 40. Water 45 was sprayed by the water spray (water supply means) 44 at 10 ml/min to both the roll surfaces (support face) of the rotation rolls 40, and the lower surface of the water-containing gel 19 supported by the roll surfaces as the step (D).

The water-containing gel 19 supplied to the gel granulator 21 was granulated into a size of, for example, about 10 cm square. The resulting granulated water-containing gel 19 was then placed in the screw-type extruder (corresponding to gel pulverizer 22) with spiral protrusions inside the main body. Then, the water-containing gel 19 was extruded through a porous plate with pores having a diameter of 9.5 mm equipped in the screw-type extruder, thereby obtaining pulverized water-containing gel 19.

After hot air drying treatment was applied for 43 minutes at 170° C., the pulverized water-containing gel was placed in a roll mill (corresponding to mill type granulator (not shown)), where the water-absorbent particles with a particle diameter of not more than 850 μm were obtained. Then, the water-absorbent fine powders were classified by a 150-μm mesh screen, and fine powders having a diameter of not more than 150 μm was removed. The resulting water-absorbent particles thus classified had a weight average particle diameter of about 300 μm.

Thereafter, an aqueous solution composed of surface cross-linking agent composed of 0.5 parts by weight of 1,4-butanediol, 0.5 parts by weight of propylene glycol, 1 part by weight of isopropyl alcohol, and 3 parts by weight of water was mixed with 100 parts by weight of water-absorbent particles, and was subjected to heat-treatment at 195° C. for 40 minutes, thereby obtaining surface-treated water-absorbent particles (one type of water-absorbent polymer).

In the manufacturing device, adhesion of the water-containing gel 19 onto the transport belt 16 and the rotation rolls 40 were not observed, and the water-containing gel 19 was smoothly transported. Moreover, the water-containing gel 19 of this example was free from flaw and cracking, and thus was not entrapped at around the supply port of the gel granulator 21.

Then, after one-week continuous driving, the manufacturing device was stopped driving, and the observation of the device was performed. As a result, adhering of the above neutralized sodium acrylate as a monomer (or a solution thereof) or a polymer of the monomer was not observed. The adhesion of the polymer on the outer surface and the inner surface of the inlet tube was hardly observed.

EXAMPLE 5

Water-absorbent particles were manufactured in the same manner as Example 4, except that water 30b was not supplied neither to the cyclone room (first mixing section) from the spray 30a, and water is not applied to the outer surface of the inlet tube provided in the polymerization device 18.

Then, after one-week continuous driving, the manufacturing device was stopped driving, and the observation of the device was performed. As a result, a water-containing gel which showed higher light transmittance than that of comparative example 1 was obtained, as an effect of performing the step (A). Namely, the water-absorbent particles, which 1) contained smaller amount of residual bubbles, and thus 2) forming smaller amount of fine powders with an application of a mechanical damage expected for pneumatic conveying, and 3) showed desirable absorbency under pressure and absorbency, were obtained.

Moreover, as an effect of performing the step (D), a smooth transportation of the water-containing gel was realized without being damaged.

However, by omitting the step (B), adhesion of a polymer of above neutralized sodium acrylate in white color inside the cyclone room, and the inner and outer surfaces of the introduction tube was observed as compared to the water-containing gel of Example 4.

EXAMPLE 6

A water-absorbent polymer was prepared using the manufacturing device shown in FIG. 1. The conditions for the transport belt 16 (length, transport speed, and material), and for the cooling zone 18a and the heating zone 18b (lengths, cooling/heating conditions) in this example were the same as those of Example 1. The atmosphere in the vicinity of the upper surface of the transport belt 16 was adjusted to be not more than 1 volume percent (vol %) of oxygen by introducing thereto nitrogen gas.

As the step (C), The infrared radiation thermometers $T_1$ to $T_6$ serving as the temperature detection means are attached to the upper wall of the polymerization device 18 so as to measured temperatures about 50 cm above the surface of the belt. Specifically, the infrared radiation thermometers $T_1$ to $T_6$ were provided above the cooling zone 18a of 15 m length at intervals of 3 m (at 3 m, 6 m, 9 m, 12 m, and 15 m, from one end of the cooling zone 18a, and the infrared radiation thermometer $T_6$ was provided in the vicinity of the discharge port of the polymerization device 18 (above the heating zone 18b). It should be noted here that the temperatures to be measured by the infrared radiation thermometers $T_1$ to $T_6$ had been proved to be equivalent to reaction temperatures of the polymerization reaction (in this example, the surface temperature of the aqueous monomer solution subjected to the polymerization reaction) by the preliminary experiments.

As a raw material of the water-absorbent polymer, 70 mole percent neutralized sodium acrylate (monomer) was used. Firstly, an aqueous monomer solution was prepared by adding polyethylene glycol diacrylate (average added mole number=8) as a cross-linking agent to 39 percent by weight of an aqueous monomer solution of above neutralized sodium acrylate, and the resulting monomer solution (aqueous monomer solution) was supplied into the monomer tank 11. The polyethylene glycol diacrylate was added in a ratio of 0.1 mole based on 1 mole of the above neutralized sodium acrylate.

Then, the resulting aqueous monomer solution was supplied into the ejector 12, and nitrogen gas was continuously introduced to the aqueous monomer solution so as to remove oxygen dissolved therein. Here, an amount of oxygen dissolved in the aqueous monomer solution as a result of this continuous oxygen removal treatment by continuously supplying nitrogen gas was adjusted to be in a range of from 0.5 mg/L to 1 mg/L. In this state, the temperature of the aqueous monomer solution was maintained in a range of from 18° C. to 19° C. After removing the oxygen dissolved therein, the aqueous monomer solution was supplied to the mixing column 15. In the mixing column 15, added were 0.12 g of sodium persulfate (NaPs) and 0.002 g of L-ascorbic acid based on 1 mole of the above neutralized sodium acrylate from the initiator tank 13 and the reducing agent tank 14 respectively, to be mixed with the aqueous monomer solution.

Figure 7:
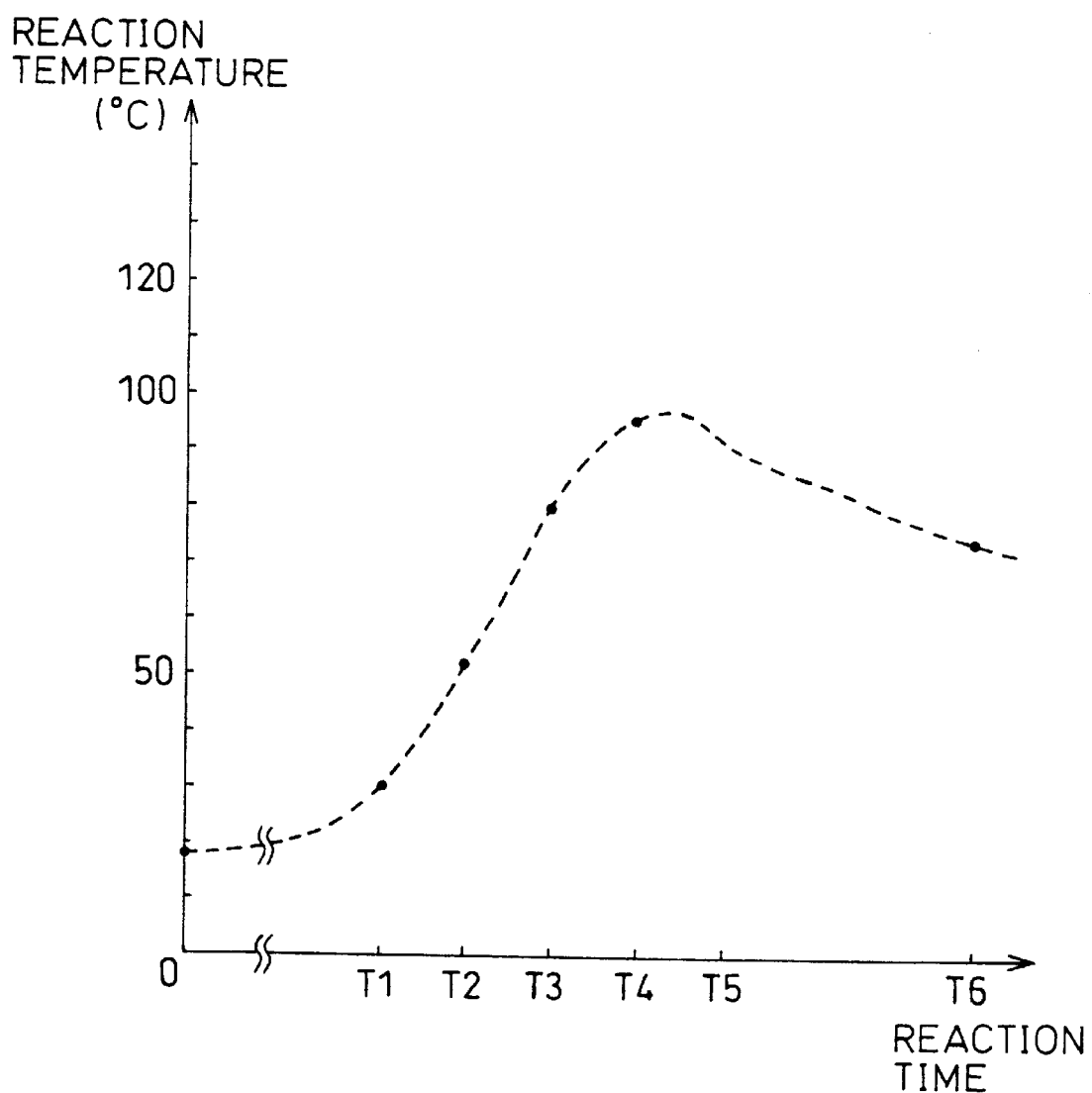
FIG. 7 is a graph showing a change pattern of a surface temperature of a monomer subjected to a polymerization reaction (reaction temperatures of the polymerization reaction) when manufacturing a water-absorbent polymer by the method of the present invention.

Then, the aqueous monomer solution was continuously supplied (continuous supply) on the upper surface of the transport belt 16 so as to have a thickness of 23 mm via the nozzle port 15a. While the polymerization was being performed, reaction temperatures were measured by the infrared radiation thermometers $T_1$ to $T_6$ as the step (C). The reaction temperatures measured by the infrared radiation thermometers $T_1$ to $T_6$ were 30° C., 52° C., 80° C., 95° C., 93° C., and 75° C. respectively. The correlation between the reaction time and the reaction temperature is shown in FIG. 7. In FIG. 7, reaction time T1 to T6 indicates a time required for the monomer to be supplied from the position from which the monomer was supplied to the position right below each of the infrared radiation thermometers $T_1$ to $T_6$. In the present embodiment, the transport belt 16 was driven at a constant rate (1 m/min). Therefore, the reaction time T1 to T6 specifically indicates 3 min., 6 min., 9 min., 15 min., and 24 min. after the supply of the monomer onto the upper surface of the transport belt 16.

According to the results of measurement, the reaction temperatures of the polymerization reaction of the present embodiment increase from the measurement point by the infrared radiation thermometer $T_2$ to the measurement point by the infrared radiation thermometer $T_5$ (in the period from T3 to T5). Assumed from the results of detection that the polymerization peak occurred at position between 9 m to 15 m away from the end of the cooling zone 18a (within the cooling zone 18a), and the reaction temperature was about 100° C. Further assumed from the results of measurement that the infrared radiation thermometer $T_6$ that the reaction temperatures in the second half of the polymerization reaction were maintained to be not less than 75° C.

Namely, assumed that the polymerization peak in this example appeared in a predetermined period of a polymerization reaction under cooling (first polymerization reaction). Also assumed that the peak temperature and the reaction temperature(s) in the second half of the polymerization reaction was in respective desirable ranges of from 60 to 120° C., and above 50° C. Therefore, assumed that a water-containing gel (one type of water-absorbent polymer) 19 was manufactured by the polymerization reaction as expected.

Then, after granulating the water-containing gel 19 by the gel granulator 21 shown in FIG. 1, the resulting granulated water-containing gel 19 was pulverized by the gel pulverizer 22. Subsequently, the resulting pulverized gel was subjected to the drying process at 170° C. for 40 minutes, thereby obtaining water-absorbent particles A. The water-absorbent particles A was confirmed to have desirable properties as expected with saturated absorbency of 32 (g/g), water-soluble content of 7 percent by weight, and an amount of residual monomer of 300 ppm. For the measurement of saturated absorbency, the method explained earlier was adopted, and in this example, the measurement time was set to 60 minutes.

The above soluble component (water-soluble component) was measured in the following manner.

The above water-absorbent particles F(g) (about 0.5 g) was dispersed in 1000 g of deionized exchanged water. Then, the dispersed solution was kept stirred for 16 hours to let the same swell in a satisfactory manner. Subsequently, the dispersed solution was filtered through a filter paper, and the resulting 50 g of filtrate was placed in 100 ml beaker. To the filtrate, added were 1 of an aqueous solution of 0.1N sodium hydroxide, 10 ml of an aqueous solution of methylglycol chitosan, 4 drops of an 0.1 percent aqueous solution of toluidine blue. Then, the solution in the beaker was titrated by a colloidal titration method using an aqueous solution of N/400 polyvinyl potassium sulfate, and when the color of the solution was turned,from blue to red purple, the titration was terminated, and the amount of titration H (ml) was measured.

The above process was repeated using 50 g of deionized water in replace of 50 g of filtrate, and the amount of titration I (ml) was measured as a blank. Then, a water-soluble component (weight %) was measured according to the following formula based on the respective amounts of titration and an average molecular weight J of the monomer as a raw material of the water-absorbent particles.

Water-Soluble Component (weight %)=(I(ml)−H(ml))×0.005/F(g).

To 1000 g of deionized water, 0.5 g of water-absorbent particles were added, and was subjected to extraction for 2 hours while stirring. Then, the resulting swollen water-absorbent particles were filtered by a filter paper, and the residual monomer in the filtrate was analyzed using a liquid chromatography. On the other hand, an aqueous monomer solutions with known concentrations were analyzed as standard solutions to obtain a calibration curve. By setting the calibration curve as an external standard, the amount of the residual monomer content in the water-absorbent particles was calculated by considering the degree of dilution of the filtrate.

EXAMPLE 7

A water-absorbent polymer was manufactured under the same condition as Example 6 using the manufacturing device adopted in Example 6. However, assumed from the results of measurement of the reaction temperatures by the infrared radiation thermometers $T_1$ to $T_6$ as the step (C), the polymerization reaction in the first half of the polymerization reaction proceeded abruptly as indicated by the pattern (C) in FIG. 8, and thus a supply of aqueous monomer solution to the polymerization device 18 was stopped.

The resulting water-containing gel 19 was subjected to the granulating, pulverizing and drying processes in the same manner as Example 6, thereby obtaining water-absorbent particles B. The water-absorbent particles B showed saturated absorbency of water of 30 (g/g), an amount of water-soluble content of 10 percent by weight, and an amount of residual monomer of 800 ppm. Namely, the water-absorbent particles B were confirmed to be inferior to the water-absorbent particles A in any of the above properties. As described, according to the forgoing method of the present invention, by monitoring reaction temperatures of the polymerization reaction, further manufacturing of water-absorbent particles B having undesirable properties can be prevented.

Here, the desirable pattern of the polymerization reaction, more particularly the pattern shown in FIG. 8(B) could have been achieved by performing any of the following steps without stopping the supply of the aqueous monomer solution to the polymerization device 18. 1) reducing an amount of supply of sodium persulfate (NaPs) and/or L-ascorbic acid; 2) reducing an amount of supply of nitrogen gas per unit time from the ejector 12; 3) making the aqueous monomer solution on the upper surface of the transport belt 16 thinner; 4) reducing temperature of cool water and/or increasing an amount of circulation of cool water in the case of cooling the cooling zone 18a with cool water.

EXAMPLE 8

A water-absorbent polymer was manufactured under the same condition as Example 6 using the manufacturing device adopted in Example 6. However, assumed from the results of measurement of the reaction temperatures by the infrared radiation thermometers $T_1$ to $T_6$ as the step (C), the start of the polymerization reaction was delayed as indicated by the pattern D in FIG. 8, and thus a further supply of water to the polymerization device 18 was stopped.

The resulting water-containing gel 19 was subjected to granulating, pulverizing and drying processes in the same manner as Example 6, thereby obtaining water-absorbent particles C. The water-absorbent particles C showed saturated absorbency of water of 34 (g/g), an amount of water-soluble content of 12 percent by weight, and an amount of residual monomer of 1000 ppm. Namely, the water-absorbent particles C were confirmed have significantly larger "amount of water-soluble component" and "an amount of residual monomer" as compared to the water-absorbent particles A. As described, according to the forgoing method of the present invention, by monitoring reaction temperatures of the polymerization reaction, further manufacturing of water-absorbent particles C having undesirable properties can be prevented.

Here, the desirable pattern of the polymerization reaction, more particularly the pattern shown in FIG. 8(B) could have been achieved by performing any of the following steps without stopping the supply of the aqueous monomer solution to the polymerization device 18. 1) increasing an amount of supply of sodium persulfate (NaPs) and/or L-ascorbic acid; 2) increasing an amount of supply of nitrogen gas per unit time by the ejector 12; 3) raising the temperature of the aqueous monomer solution supplied onto the upper surface of the transport belt 16; 4) raising temperature of cool water in the cooling process of the cooling zone 18a with cool water.

EXAMPLE 9

Water-absorbent particles were manufactured in the same manner as Example 4 except that the water 43 was not added dropwise by the dropping funnels 42, and the water 45 was not sprayed from the spray 44 as the step (D).

As a result, a water-containing gel which showed higher light transmittance than that of comparative example 1 was obtained, as an effect of performing the step (A). Namely, the water-containing gel, which 1) contained smaller amount of residual bubbles, and thus 2) forming smaller amount of fine powders with an application of a mechanical damage expected for pneumatic conveying, and 3) showed desirable absorbency under pressure and absorbency, were obtained. Further, as an effect of performing the step (B), adhesion of a polymer of the above neutralized sodium acrylate in white color in the cyclone room, and the inner and outer surfaces of the introduction tube was not observed.

However, as the step (D) was omitted, the water-containing gel 19 adhered to the transport belt 16 was often observed, and the water-containing gel 19 was difficult to be separated from the transport belt 16. Specifically, the water-containing gel 19 adhered to the inner surfaces 16a' of the side walls 16a was observed to be partially remained. For this reason, the both side ends of the water-containing gel 19 separated from the transport belt 16 were partially cut out, and cracking or separation from the cut portion were observed. Further, it was often observed from the cut portion, the water-containing gel 19 being entrapped in between rotation rolls 40, and clogged at the supply port of the gel grinder 21. Thus, a smooth transportation of the water-containing gel becomes more difficult. Additionally, the water-containing gel 19 was liable to the roll surfaces of the rotation rolls 40, a smooth transportation of the water-containing gel 19 was often disturbed.

EXAMPLE 10

Water-absorbent particles were manufactured in a continuous manner in the same manner as Example 4 except that condensation of water-vapor (water) was formed on the roll surfaces (support face) by supplying cool water of 5° C. inside the respective rotation rolls 40 (for example, inside tube-like shafts of the rotation rolls 40) instead of spraying water 45 from the water spray 44 in Example 4.

In the manufacturing device, adhesion of the water-containing gel 19 onto the transport belt (transport means) 16 and the rotation rolls (transport means) 40 was not observed, and the water-containing gel 19 was transported smoothly. Moreover, both side ends of the water-containing gel were free from flaw and cut (crack). The water-containing gel 19 was transported without being entrapped in vicinity of the supply port of the gel grinder 21.

EXAMPLE 11

Water-absorbent particles were manufactured in a continuous manner in the same manner as Example 4 except that the roll surfaces of respective rotation rolls 40 were covered with humectant, and in addition to the processes performed in Example 4, the temperature inside each rotation rolls 40 was maintained at temperatures in a range of from 60 to 80° C. using heating means (not shown), and the water-containing gel 19 was heated while being transported by the rotation rolls 40.

In the manufacturing device, the water-containing gel 19 adhering to the transport belt (transport means) 16 and the rotation rolls (rotation means) 40 was not observed, and the water-containing gel 19 was transported smoothly. Moreover, both side ends of the water-containing gel 19 were free from flaw and cut (crack). The water-containing gel 19 was transported without being entrapped in a vicinity of the supply port.

According to the method of this example, the water-containing gel 19 scraped from the polymerization device 18 was heated, and thus the water-containing gel 19 being granulated could be prevented from being kneaded. Furthermore, with this heat treatment, since the maturing of the water-containing gel processed, a final product of water-absorbent particles contained smaller amount of residual monomer or water-soluble components as compared to the conventional water-absorbent particles.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A continuous manufacturing method of a water-absorbent polymer by continuously performing a polymerization of a hydrophilic monomer using a solution containing a hydrophilic monomer, comprising at least one of the following steps (A) to (D):

(A) introducing an inert gas into said solution in a continuous manner before subjecting said solution to a polymerization reaction, and subsequently removing the inert gas from said solution;

(B) supplying said solution to a polymerization process, and washing out said solution with water supplied before, at, or after a timing of supplying said solution to the polymerization process;

(C) detecting reaction temperatures of a polymerization reaction in non-contact manner at a plurality of points different distances away from a point from which said solution is supplied; and (D) supplying water to a water-containing gel and/or transport means when transporting the water-containing gel of the water-absorbent polymer obtained in or after the polymerization reaction.

2. The continuous manufacturing method of a water-absorbent polymer as set forth in claim 1, wherein:
   said polymerization of the hydrophilic monomer is performed on an endless belt.

3. The continuous manufacturing method of a water-absorbent polymer as set forth in claim 1, wherein said step (C) includes the steps of:
   detecting at least a temperature in a second half of said polymerization reaction, a peak temperature, or a peak timing, and controlling said polymerization reaction based on results of detection of the above step.

4. The continuous manufacturing method of a water-absorbent polymer as set forth in claim 3, wherein:

said polymerization reaction is performed under cooling for a predetermined period, and said polymerization reaction is controlled based on the results of detection of said step (C) such that the polymerization peak appears in said predetermined period.

5. The continuous manufacturing method of a water-absorbent polymer as set forth in claim 3, wherein:

said polymerization reaction is controlled by adjusting an amount of supply and/or a temperature of the hydrophilic monomer.

6. The continuous manufacturing method of a water-absorbent polymer as set forth in claim 1, wherein:

in said step (A), said inert gas is removed from said solution before subjecting said solution to the polymerization reaction.

7. The continuous manufacturing method of a water-absorbent polymer as set forth in claim 1, wherein:

in said step (A), said inert gas continuously supplied into said solution is removed from said solution by applying thereto ultrasonic.

8. The continuous manufacturing method of a water-absorbent polymer as set forth in claim 7, wherein:

said ultrasonic has a frequency of not less than 25 kHz.

9. The continuous manufacturing method of a water-absorbent polymer as set forth in claim 1, wherein:

in said step (A), said inert gas continuously supplied into said solution is removed from said solution by generating circulating flow of said solution.

10. The continuous manufacturing method of a water-absorbant polymer as set forth in claim 9, further comprising the step of:

supplying an initiator of said polymerization reaction into the circulating flow of said solution.

11. The continuous manufacturing method of a water-absorbent polymer as set forth in claim 1, wherein:

in said step (A), said inert gas is removed from said solution such that a resulting water-containing gel in one form of the water-absorbent polymer has a light transmittance of not less than 10 percent.

12. The continuous manufacturing method of a water-absorbent polymer as set forth in claim 1, wherein said step (B) further includes the steps of:

supplying said solution containing a hydrophilic monomer into a container with a supply port through which said solution is supplied therein and a discharge port through which said solution is discharged therefrom, said discharge port being provided below a position where said supply port is provided, and supplying water to at least a part of an area of an inner surface of said container where said solution contacts, at or before a timing of supplying said solution into said container.

13. The continuous manufacturing method of a water-absorbent polymer as set forth in claim 12, wherein:

a smallest area of said container, which is surrounded by a cross line between an inner surface of said container and a horizontal plane, is said horizontal plane including the discharge port.

14. The continuous manufacturing method of a water-absorbent polymer as set forth in claim 12, wherein:

a smallest area of said container, which is surrounded by a cross line between an inner surface of said container and a horizontal plane, is positioned below a horizontal plane including the supply port and above a horizontal plane including the discharge port.

15. The continuous manufacturing method of a water-absorbent polymer as set forth in claim 12, wherein:

said container includes a mixer for mixing said solution containing a hydrophilic monomer with an initiator of said polymerization reaction.

16. The continuous manufacturing method of a water-absorbent polymer as set forth in claim 12, wherein:

said container includes gas removing means for removing the inert gas from said solution containing a hydrophilic monomer.

17. The continuous manufacturing method of a water-absorbent polymer as set forth in claim 1, wherein said step (B) includes the steps of:

supplying said solution containing a hydrophilic monomer from an inlet tube to a polymerization section; and supplying water, before or at a timing of supplying said solution containing a hydrophilic monomer to the polymerization section, to at least a part of an area of an inner surface and/or outer surface of said container where said solution contacts.

18. The continuous manufacturing method of a water-absorbent polymer as set forth in claim 17, said polymerization section is provided with transport means for transporting said solution supplied continuously from said inlet tube onto an upper surface thereof, and said solution is supplied onto the upper surface of said transport means from a position from 0.5 cm to 50 cm above the upper surface.

19. The continuous manufacturing method of a water-absorbent polymer as set forth in claim 1, said step (D) includes the steps of:

supplying water, when transporting the water-containing gel being supported by a support face of said transport means, to said support face and/or an area in a vicinity of a part of the water-containing gel, being supported by said support face, and subsequently transporting the water-containing gel separated from said support face to an exterior of said transport means.

20. The continuous manufacturing method of a water-absorbent polymer as set forth in claim 1, wherein said step (D) includes the step of:

supplying water, when transporting the water-containing gel being supported by a support face of said transport means while being moved relative to said support face, to said support face and/or an area in a vicinity of a part of the water-containing gel, being supported by said support face.

21. The continuous manufacturing method of a water-absorbent polymer as set forth in claim 1, wherein said step (D) includes the steps of:

supplying water, when transporting the water-containing gel resulting from a static polymerization of the hydrophilic monomer on an endless belt along a transport direction while being supported by the support face of said endless belt, to a rear end portion of said support face in a water-containing gel transport direction and/or to a rear end portion of the water-containing gel in the water-containing gel transport direction, and subsequently transporting the water-containing gel separated from said support face to an exterior of said endless belt.

22. The continuous manufacturing method of a water-absorbent polymer as set forth in claim 19, wherein in said step (D), said water is supplied in a form of condensation by adjusting a temperature of said support face to or below a dew point in its atmosphere.

23. The continuous manufacturing method of a water-absorbent polymer as set forth in claim 1, wherein said step (D) includes:

supplying water, when transporting the water-containing gel while being supported by rolls as said transport means, to the water-containing gel and/or said rolls.

24. The continuous manufacturing method of a water-absorbent polymer as set forth in claim 1, wherein said step (D) includes the step of heating the water-containing gel being supported by said transport means.

25. A continuous manufacturing method of a water-absorbent polymer by continuously performing a polymerization of a hydrophilic monomer using a solution containing a hydrophilic monomer, comprising the step of:

(C) detecting reaction temperatures of a polymerization reaction in non-contact manner at a plurality of points different distances away from a point where the solution is supplied.

26. The continuous manufacturing method of a water-absorbent polymer as set forth in claim 25, further comprising the step of:

(D) supplying water to a water-containing gel and/or transport means when transporting the water-containing gel of the water-absorbent polymer obtained in or after the polymerization reaction.

27. A continuous manufacturing method of a water-absorbent polymer by continuously performing a polymerization of a hydrophilic monomer using a solution containing a hydrophilic monomer, comprising the step of:

(A) introducing an inert gas into said solution in a continuous manner before subjecting said solution to a polymerization reaction, and subsequently removing the inert gas from said solution.

28. A continuous manufacturing method of a water-absorbent polymer by continuously performing a polymerization of a hydrophilic monomer using a solution containing a hydrophilic monomer, comprising the step of:

(D) supplying water to a water-containing gel and/or transport means so as to prevent adhesion of the water-containing gel onto said transport means, when transporting the water-containing gel onto said transport means of the water-absorbent polymer obtained in or after the polymerization reaction.

29. A continuous manufacturing method of a water-absorbent polymer by continuously performing a polymerization of a hydrophilic monomer using a solution containing a hydrophilic monomer, comprising the step of:

(B) supplying said solution to a polymerization process, and washing out said solution with water supplied before, at, or after a timing of supplying said solution to the polymerization process.

* * * * *